United States Patent
Chilimbi et al.

(10) Patent No.: US 7,343,598 B2
(45) Date of Patent: Mar. 11, 2008

(54) CACHE-CONSCIOUS COALLOCATION OF HOT DATA STREAMS

(75) Inventors: Trishul Chilimbi, Seattle, WA (US); Ran Shaham, Givat Shmuel (IL)

(73) Assignee: Microsoft Corporation, Redmond, WA (US)

( * ) Notice: Subject to any disclaimer, the term of this patent is extended or adjusted under 35 U.S.C. 154(b) by 717 days.

(21) Appl. No.: 10/737,205

(22) Filed: Dec. 15, 2003

(65) Prior Publication Data

US 2004/0215880 A1    Oct. 28, 2004

Related U.S. Application Data

(60) Provisional application No. 60/465,917, filed on Apr. 25, 2003.

(51) Int. Cl.
*G06F 9/45* (2006.01)

(52) U.S. Cl. .............. 717/158; 717/151; 711/118; 711/119; 711/151

(58) Field of Classification Search .......... 717/139, 717/164, 151, 158; 707/203; 348/169; 711/118, 711/119, 151
See application file for complete search history.

(56) References Cited

U.S. PATENT DOCUMENTS

| | | | |
|---|---|---|---|
| 5,220,667 A | 6/1993 | Ichieda | |
| 5,333,311 A | 7/1994 | Whipple, II | |
| 5,713,008 A | 1/1998 | Falkner | |
| 5,740,443 A | 4/1998 | Carini | |
| 5,774,685 A | 6/1998 | Dubey | |
| 5,815,720 A | 9/1998 | Buzbee | |
| 5,909,578 A | 6/1999 | Buzbee | |
| 5,925,100 A | 7/1999 | Drewry et al. | |
| 5,940,618 A | 8/1999 | Blandy et al. | |
| 5,950,003 A | 9/1999 | Kaneshiro et al. | |
| 5,950,007 A | 9/1999 | Nishiyama et al. | |
| 5,953,524 A | 9/1999 | Meng et al. | |
| 5,960,198 A | 9/1999 | Roediger et al. | |
| 6,026,234 A | 2/2000 | Hanson et al. | |
| 6,073,232 A | 6/2000 | Kroeker et al. | |
| 6,079,032 A | 6/2000 | Peri | |
| 6,122,638 A * | 9/2000 | Huber et al. | 707/103 Y |
| 6,148,437 A | 11/2000 | Shah et al. | |
| 6,311,260 B1 | 10/2001 | Stone et al. | |

(Continued)

OTHER PUBLICATIONS

U.S. Appl. No. 11/134,812, filed May 20, 2005, Ganapathy et al.

(Continued)

*Primary Examiner*—Meng-Al T. An
*Assistant Examiner*—Mark P. Francis
(74) *Attorney, Agent, or Firm*—Klarquist Sparkman, LLP

(57) ABSTRACT

Techniques and tools for coallocating objects and/or object fields for the sake of cache performance are described. For example, a tool improves cache performance by coallocating contemporaneously accessed heap objects. The tool analyzes object accesses to identify hot data streams in a profile run of a program. The tool directs allocations for objects in a given hot data steam to the same sequentially allocated arena, separating intervening allocations coming from other allocation sites. The tool enforces the solution by redirecting heap allocations to a run-time coallocation library. The tool and analysis extend to coallocation at object field granularity. The resulting field coallocation solution generalizes common data restructuring techniques and provides insight into object restructuring by breaking down the coallocation benefit on a per-technique basis.

52 Claims, 19 Drawing Sheets

U.S. PATENT DOCUMENTS

| | | | |
|---|---|---|---|
| 6,321,240 | B1 | 11/2001 | Chilimbi et al. |
| 6,330,556 | B1* | 12/2001 | Chilimbi et al. ............... 707/2 |
| 6,360,361 | B1 | 3/2002 | Larus et al. |
| 6,404,455 | B1* | 6/2002 | Ito et al. ...................... 348/169 |
| 6,405,292 | B1* | 6/2002 | Joseph et al. ............... 711/150 |
| 6,560,693 | B1 | 5/2003 | Puzak et al. |
| 6,571,318 | B1 | 5/2003 | Sander et al. |
| 6,628,835 | B1* | 9/2003 | Brill et al. ................... 382/226 |
| 6,651,243 | B1 | 11/2003 | Berry et al. |
| 6,658,652 | B1 | 12/2003 | Alexander et al. |
| 6,675,374 | B2 | 1/2004 | Pieper et al. |
| 6,704,860 | B1 | 3/2004 | Moore |
| 6,848,029 | B2 | 1/2005 | Coldewey |
| 6,886,167 | B1* | 4/2005 | Breslau et al. .............. 719/315 |
| 6,951,015 | B2 | 9/2005 | Thompson |
| 7,032,217 | B2 | 4/2006 | Wu |
| 2002/0133639 | A1* | 9/2002 | Breslau et al. .............. 709/315 |
| 2002/0144245 | A1 | 10/2002 | Lueh |
| 2003/0163658 | A1* | 8/2003 | Lanzatella et al. .......... 711/163 |
| 2004/0015897 | A1 | 1/2004 | Thompson et al. |
| 2004/0015930 | A1 | 1/2004 | Wu |
| 2004/0025145 | A1 | 2/2004 | Dawson |
| 2004/0103401 | A1 | 5/2004 | Chilimbi et al. |
| 2004/0103408 | A1 | 5/2004 | Chilimbi et al. |
| 2004/0111444 | A1 | 6/2004 | Garthwaite |
| 2004/0133556 | A1* | 7/2004 | Wolczko et al. ............... 707/3 |
| 2005/0091645 | A1 | 4/2005 | Chilimbi et al. |
| 2005/0246696 | A1 | 11/2005 | Alexander et al. |

OTHER PUBLICATIONS

U.S. Appl. No. 11/134,796, filed May 20, 2005, Shankar et al.
U.S. Appl. No. 11/115,924, filed Apr. 26, 2005, Chilimbi et al.
Ammons et al., "Exploiting Hardware Performance Counters with Flow and Context Sensitive Profiling", PLDI (Jun. 1997), 12 pages.
Ammons et al., "Improving Data-Flow Analysis with Path Profiles," *SIGPLAN '98* (1998), pp. 72-84.
Anderson et al., "Continuous Profiling: Where Have All the Cycles Gone?", ACM (Nov. 1997), pp. 357-390.
Annavaram et al., "Data Prefetching by Dependence Graph Precomputation", IEEE (2001), pp. 52-61.
Arnold et al., "A Framework for Reducing the Cost of Instrumented Code", *Rutgers University Technical Report DCS-TR-424* (Nov. 2000), pp. 1-10.
Bala et al., "Dynamo: A Transparent Dynamic Optimization System", ACM (2000), pp. 1-12.
Balakrishnan et al., "Analyzing Memory Accesses in χ86 Binary Executables", *Proc. 13th Intl. Conference on Compiler Construction*, LNCS 2985 (Apr. 2004), pp. 5-23.
Ball et al., "Efficient Path Profiling", IEEE (1996), pp. 46-57.
Bush et al., "A Static Analyzer for Finding Dynamic Programming Errors", *Software: Practice and Experience* (2000), pp. 775-802.
Cahoon et al., "Data Flow Analysis for Software Prefetching Linked Data Structures in Java", IEEE (2001), 12 pages.
Chen et al., "Reducing Memory Latency via Non-Blocking and Prefetching Caches", ACM (1992), pp. 51-61.
Chilimbi et al., "Dynamic Hot Data Stream Prefetching for General-Purpose Programs", ACM (2002), 11 pages.
Chilimbi et al., "Low-Overhead Memory Leak Detection Using Adaptive Statistical Profiling", *Proc. 11th Intl. Conference on Architectural Support for Programming Language and Operating Systems (ASPLOS)*, (Oct. 2004), pp. 156-164.
Chilimbi et al., "Using Generational Garbage Collection to Implement Cache-Conscious Data Placement", *Proceedings of the First International Symposium on Memory Management* (Oct. 1998), vol. 34(3), pp. 37-48.
Cooksey et al., "A Stateless, Content-Directed Data Prefetching Mechanism", ACM (2002), pp. 279-290.
Cowan et al., "Buffer Overflows: Attacks and Defenses for the Vulnerability of the Decade", *DARPA information survivability conference and expo (DISCEX)* (2000), pp. 1-11.

Dean et al., "*ProfileMe*: Hardware Support for Instruction-Level Profiling on Out-of-Order Processors", *Proc. 30th Annual Intl. Symp. On Microarchitecture* (Dec. 1997), 12 pages.
Deaver et al., "Wiggins/Restone: An On-line Program Specializer", *Proceedings of the IEEE Hot Chips XI Conference* (Aug. 1999), 29 pages.
Demsky et al., "Automatic Detection and Repair of Errors in Data Structures", *Proceedings of 18th ACM SIGPLAN Conference on Object-Oriented Programming Systems, Language and Applications (OOPLSA)* (Oct. 2003), pp. 78-95.
Demsky et al., "Role-Based Exploration of Object-Oriented Programs", *Proceedings of 24th International Conference on Software Engineering (ISCE)* (May 2002), pp. 313-334.
Dor et al., "Cleanness Checking of String Manipulations in C Programs via Integer Analysis", *Proc. 8th Int'l Static Analysis Symposium* (Jun. 2001), 19 pages.
Dor et al., "CSSV: Towards a Realistic Tool for Statically Detecting All Buffer Overflows in C", *PLDI'03* (Jun. 9-11, 2003), pp. 155-167.
Duesterwald et al., "Software profiling for hot path prediction: Less is more", *Ninth International Conference on Architectural Support for Programming Languages and Operating Systems* (Nov. 2000), pp. 202-211.
Edwards, "Black-Box Testing Using Flowgraphs: An Experimental Assessment of Effectiveness and Automation Potential", *Software Testing, Verification and Reliability*, vol. 10, No. 4 (Dec. 2000), pp. 249-262.
Eeckhout et al., "Workload Design: Selecting Representative Program-Input Pairs", *Proceedings of the 2002 International Conference on Parallel Architectures and Compilation Techniques* (2002), 12 pages.
Ernst, "Dynamically Discovering Likely Program Invariants", *PhD Thesis, University of Washington* (Aug. 2000), pp. 1-127.
Evans et al., "Improving Security Using Extensible Lightweight Static Analysis", *IEEE Software* (Jan./Feb. 2002), pp. 42-51.
Evans et al., "LCLint: A Tool for Using Specifications to Check Code", *SIGSOFT Symposium on the Foundations of Software Engineering* (Dec. 1994), 10 pages.
Evans et al., "Splint Manual, Version 3.1.1-1", *Secure Programming Group, University of Virginia Department of Computer Science* (Jun. 5, 2003), 121 pages.
Evans, "Static Detection of Dynamic Memory Errors", *SIGPLAN Conf. on Programming Language and Design Implementation* (May 1996), 10 pages.
Evans, "Using Specifications to Check Source Code", *TR-628, MIT Lab for Computer Science* (Jun. 1994), 97 pages.
Foster et al., "A Theory of Type Qualifiers", *Proc. ACM SIGPLAN '99 Conf. on Programming Language and Design Implementation (PLDI)* (May 1999), 12 pages.
Guyer et al., "An Annotation Language for Optimizing Software Libraries", *Proc. Second Conf. on Domain Specific Languages* (Oct. 1999), 14 pages.
Hangal et al., "Tracking Down Software Bugs Using Automatic Anomaly Detection", *Proceedings of 22nd International Conference on Software Engineering (ICSE)* (Jan. 1992), pp. 125-136.
Harris, "Dynamic Adaptive Pre-tenuring", *Proceedings of the International Symposium on Memory Management* (Oct. 2000), 9 pages.
Hastings et al., "Purify: Fast Detection of Memory Leaks and Access Errors", *Proceedings of the Winter 1992 USENIX Conference* (1992), 10 pages.
Heil et al., "Relational Profiling: Enabling Thread-Level Parallelism in Virtual Machines", *Proc. 33rd International Symposium on Microarchitecture* (Dec. 2000), pp. 1-10.
Hirzel et al., "Understanding the Connectivity of Heap Objects", *Proceedings of International Symposium on Memory Management (ISMM)* (Jun. 2002), pp. 143-156.
Hollingsworth et al., "MDL: A Language and Compiler for Dynamic Program Instrumentation", *Proc. Of the International Conference on Parallel Architectures and Compilations Techniques* (Nov. 1997), 12 pages.
Hölzle et al., "Reconciling Responsiveness with Performance in Purse Object-Oriented Languages", *ACM Transactions on Programming Languages and Systems* (Jul. 1996), pp. 1-40.

Horning, "The Larch Shared Language: Some Open Problems", *Compass/ADT Workshop* (Sep. 1995), 16 pages.

Joseph et al., "Prefetching Using Markov Predictors", ACM (1997), pp. 252-263.

Jouppi, "Improving Direct-Mapped Cache Performance by the Addition of a Small Fully-Associative Cache and Prefetch Buffers", IEEE (1990), pp. 364-373.

"JProfiler Manual," ejtechnologies, GmbH (2004), pp. 1-141.

Karlsson et al., "A Prefetching Technique for Irregular Accesses to Linked Data Structures", *Sixth International Symposium on High-Performance Computer Architecture* (Jan. 2000), 12 pages.

Khurshid et al., "An Analyzable Annotation Language," *OOPSLA '02* (Nov. 2002), 15 pages.

Klaiber et al., "An Architecture for Software-Controlled Data Prefetching", ACM (1991), pp. 43-53.

Kramer, "Examples of Design by Contract in Java Using Contract, the Design by Contract™ Tool for Java™", *Object World Berlin '99, Design & Components* (May 17-20, 1999), 26 pages.

Larochelle et al., "Statistically Detecting Likely Buffer Overflow Vulnerabilities", *2001 USENIX Security Symposium* (Aug. 2001), 5 pages.

Larus, "Whole Program Paths," *SIGPLAN '99 Conference on Programming Languages and Design* (1999), 11 pages.

Leavens et al., "Enhancing the Pre-and Postcondition Technique for More Expressive Specifications", *Proc. World Congress on Formal Methods in the Development of Computing Systems* (Sep. 1999), 21 pages.

Leavens et al., "Preliminary Design of JML", *Technical Report 98-06v, Iowa State University Department of Computer Science* (Jun. 1998-2003; revised May 2003), 94 pages.

Leino, "Checking Correctness Properties of Object-Oriented Programs," *Internet*, http://research.microsoft.com/leino/paper/1 (Aug. 19, 2002), 49 pages.

Luk et al., "Compiler-Based Prefetching for Recursive Data Structures", ACM (1996), pp. 222-233.

Melski et al., "Interprocedural Path Profiling", *University of Wisconsin* (1998), pp. 1-50.

Microsoft Corporation, "Scalable Program Analysis", *Internet*, http://research.microsoft.com/spa/ (downloaded on Sep. 5, 2003), 3 pages.

Mowry et al., "Design and Evaluation of a Compiler Algorithm for Prefetching", ACM (1992), pp. 62-73.

Mowry et al., "Predicting Data Cache Misses in Non-Numeric Applications Through Correlation Profiling", *International Symposium on Microarchitecture* (1997), 7 pages.

Nevill-Manning et al., "Identifying Hierarchical Structure in Sequences: A Linear-time Algorithm", *Journal of Artificial Intelligence Research* (1997), 7:67-82.

Roth et al., "Dependence Based Prefetching for Linked Data Structures", *Proceedings of the 8th International Conference on Architectural Support* (Oct. 1998), pp. 115-126.

Roth et al., "Effective Jump-Pointer Prefetching for Linked Data Structures", IEEE (1999), pp. 111-121.

Saavedra et al., "Improving the Effectiveness of Software Prefetching With Adaptive Execution", *IEEE* (1996), pp. 68-78.

Sastry et al., "Rapid Profiling Via Stratified Sampling", *International Symposium on Computer Architecture* (2001), pp. 1-12.

Savage et al., "Eraser: a dynamic data race detector for multighreaded programs", *ACM Transactions on Computer Systems (TOCS)* (1997), 391-411.

Srivastava et al., "Vulcan Binary Transformation in a Distributed Environment", *Microsoft Research, MSR-TR-99-76* (Apr. 20, 2001), pp. 1-12.

Stoutchinin et al., "Speculative Prefetching of Induction Pointers", *Proceedings of 10th International Conference on Compiler Construction* (2001), 15 pages.

"Technologies for Measuring Software Performance", *Intel Corporation* (2003), 4 pages.

Traub et al., "Ephemeral instrumentation for lightweight program profiling", *Technical report*, Harvard University (2000), pp. 1-13.

Vanderwiel et al., "Data Prefetch Mechanisms", *ACM Computing Surveys*, vol. 32, No. 2 (Jun. 2000), pp. 174-199.

Wahls et al., "The Direct Execution of SPECS-C++: A Model-Based Specification Language for C++ Classes", *Technical Report TR94-02b, Iowa State University Department of Computer Science* (Nov. 18, 1994), 52 pages.

Zhou et al., "AccMon: Automatically Detecting Memory-Related Bugs via Program Counter-Based Invariants," *Proceedings of 37th International Symposium on Micro-Architecture (MICRO)* (Dec. 2004).

Zilles et al., "A Programmable Co-processor for Profiling", *Proceedings of the 7th International Symposium on High Performance Architecture* (Jan. 2001), 12 pages.

Kistler et al., "Automated Data-Member Layout of Heap Objects to Improve Memory-Hierarchy Performance," *ACM Transactions on Programming Language and Systems*, 16 pp. (2000).

Halldorsson, "Approximations of Weighted Independent Set and Hereditary Subset Problems," *JGAA*, vol. 4, No. 1, pp. 1-16 (Apr. 2000).

Hirzel et al., "Bursty Tracing: A Framework for Low-Overhead Temporal Profiling," *Microsoft Research*, 10 pp. (2001).

Gloy et al., "Procedure Placement Using Temporal-Ordering Information," *ACM Transactions on Programming Languages and System*, vol. 21, pp. 111-161 (1999).

Chilimbi et al., "Cache-Conscious Structure Definition," *Proc. ACM SIGPLAN '99 Conf. on Programming Language Design and Impl.*, 12 pp. (May 1999).

Chilimbi et al., "Cache-Conscious Structure Layout," *Proc. ACM SIGPLAN '99 Conf. on Programming Language Design and Impl.*, 12 pp. (May 1999).

Seidl et al., "Segregating Heap Objects by Reference Behavior and Lifetime," *Eighth Int'l Conf. on Architectural Support for Programming Languages and Operating Systems*, 12 pp. (Oct. 1998).

Petrank et al., "The Hardness of Cache Conscious Data Placement," *29th Annual ACM Symposium on Principles of Programming Languages*, 33 pp. (2002).

Rubin et al., An Efficient Profile-Analysis Framework for Data-Layout Optimizations, *POPL*, 14 pp. (Jan. 2002).

Chilimbi, "On the Stability of Temporal Data Reference Profiles," *Int'l Conf. on Parallel Architectures and Compilation Techniques*, 10 pp. (Sep. 2001).

Chilimbi, "Efficient Representations and Abstractions for Quantifying and Exploiting Data Reference Locality," *ACM SIGPLAN '01 Conf. on Programming Language Design and Implementation*, 12 pp. (Jun. 2001).

Calder et al., "Cache-Conscious Data Placement," *ACM*, 11 pp. (1998).

Berger et al., "Composing High-Performance Memory Allocators," *ACM*, 11 pp. (2001).

Crescenzi et al., "A Compendium of NP Optimization Problems," 20 pp. [Downloaded from the World Wide Web on Dec. 12, 2003].

Truong et al., "Improving Cache Behavior of Dynamically Allocated Data Structures," *PACT*, 8 pp. (1998).

Srivastava, "ATOM: A System for Building Customized Program Analysis Tools," *SIGPLAN '94 Conf. on Programming Language Design and Impl.*, 25 pp. (1994).

Shaham, "Automatic Removal of Array Memory Leaks in Java," 54 pp. (1999).

English et al., "Loge: a self-organizing disk controller," *Proc. USENIX Winter 1992 Tech. Conf.*, San Francisco, pp. 237-251 (Jan. 1992).

Griffioen et al., "Reducing File System Latency Using a Predictive Approach," 11 pp., no date.

Hatfield et al., "Program Restructuring for Virtual Memory," *IBM Sys. J.*, No. 3, pp. 168-192 (1971).

Kroeger et al., "Predicting Future File-system Actions from Prior Events," *Proc. USENIX Annual Tech. Conf.*, San Diego, pp. 1-10 (Jan. 1996).

Palmer et al., "Fido: A Cache that Learns to Fetch," *Proc. 17th Int'l Conf. on Very Large Databases*, Barcelona, pp. 255-264 (Sep. 1991).

Patterson et al., "Informed Prefetching and Caching," *Proc. 15th ACM Symp. on Operating System Principles*, Copper Mountain Resort, CO, pp. 79-95 (Dec. 1995).

Staelin et al., "Smart Filesystems," *Proc. USENIX—Winter '91*, Dallas, TX, pp. 45-51 (1991).

Tait et al., "Detection and Exploitation of File Working Sets," *IEEE*, pp. 2-9 (1991).

Zorn et al., "A Memory Allocation Profiler for C and Lisp Programs," published Feb. 16, 1988, pp. 1-18.

* cited by examiner

FIG. 3A

| ht | stream | coallocatable objects | mr | coallocation set | w' |
|---|---|---|---|---|---|
| 0.6 | $a_3 b_5 c_{10}$ | $a_3, b_5$ | 1 | {A, B} | 0.6 |
| | | $a_3, c_{10}$ | 1 | {A, C} | 0.6 |
| | | $b_5, c_{10}$ | 1 | {B, C} | 0.6 |
| | | $a_3, b_5, c_{10}$ | 2 | {A, B, C} | 1.2 |
| 0.3 | $d_4 b_{15} e_6$ | $b_{15}, e_6$ | 1 | {B, E} | 0.3 |
| | | $d_4, e_6$ | 1 | {D, E} | 0.3 |
| 0.1 | $d_4 e_6 a_{12} a_{14}$ | $d_4, e_6$ | 1 | {D, E} | 0.1 |
| | | $e_6, a_{12}$ | 1 | | |
| | | $e_6, a_{14}$ | 1 | | |
| | | $a_{12}, a_{14}$ | 1 | {A} | 0.1 |
| | | $e_6, a_{12}, a_{14}$ | 2 | {A, E} | 0.2 |

FIG. 3B

| coallocation set | accumulated miss reduction | normalized miss reduction |
|---|---|---|
| {A,B} | 0.6 | 0.29 |
| {A,C} | 0.6 | 0.29 |
| {B,C} | 0.6 | 0.29 |
| {A,B,C} | 1.2 | 0.57 |
| {B,E} | 0.3 | 0.14 |
| {D,E} | 0.4 | 0.19 |
| {A,E} | 0.2 | 0.1 |
| {A} | 0.1 | 0.05 |

FIG. 3C

| | set packing | miss reduction |
|---|---|---|
| 1 | {A,B,C}, {D,E} | 0.76 |
| 2 | {A,B}, {D,E}, {C} | 0.48 |
| 3 | {A,C}, {D,E}, {B} | 0.48 |
| 4 | {A,C}, {B,E}, {D} | 0.43 |
| 5 | {A,E}, {B,C}, {D} | 0.38 |
| 8 | {A}, {B,C}, {D,E} | 0.52 |
| 9 | {A}, {B,E}, {C,D} | 0.19 |

FIG. 3D

Coallocation layout for set packing 1

| Arena for allocation sites A, B, and C | $b_1$ | $a_3$ | $b_5$ | $c_{10}$ | $c_{11}$ | $a_{12}$ | $a_{14}$ | $b_{15}$ | ... |
|---|---|---|---|---|---|---|---|---|---|

| Arena for other allocation sites | $d_2$ | $d_4$ | $e_6$ | $d_7$ | $d_8$ | $d_9$ | $d_{13}$ | ... |
|---|---|---|---|---|---|---|---|---|

FIG. 5A

// first phase: compute cache miss reduction weights for coallocation sets.

// The parameter object coallocatable communicates the criteria for coallocating objects, // and the criteria may vary with different coallocatability definitions.

computeWeight(object coallocatable, w)

// second phase: compute approximated weighted set packing according to Halldórsson's // algorithm, where $\Pi$ is the set of hot data streams and $\Pi_{WSP}$ is a partition of $S_{alloc}(\Pi)$ // with approximated maximal cache miss reduction.

$\Pi_{WSP} = WSP(S_{alloc}(\Pi), \{\langle C, w(C) \rangle \mid w(C) > 0\})$ $R_o = \sum_{C \in \Pi_{WSP}} w(C)$ output $\Pi_{WSP}$ // third phase: compute cache miss reduction for a given layout, and then normalize weights.

for every $H \in \Pi$ $w_{total} = w_{total} + (|H| - 1) * \text{heat}(H)$

// C is a set of coallocatable objects.

$C = \emptyset$ loop $a \in H$ according to layout order if objects in $C \cup a$ are laid out contiguously $C = C \cup a$ else $w_l = w_l + (|C| - 1) * \text{heat}(H)$ $C = \{a\}$ $R_l = w_l / w_{total}$ // fourth phase: relate (sub)optimal coallocation and the given layout cache miss reduction numbers.

$R_l^o = (R_o - R_l)/(1 - R_l)$ output $R_l^o$

FIG. 5B

// Get cache miss reduction for coallocation sets, where $\Pi$ is the set of hot data streams, and
// heat(H) gives the normalized heat of H. Coallocatable expresses the coallocatability criteria.
computeWeight(coallocatable, w)
    for $H \in \Pi$
        $w_{total} = w_{total} + (|H| - 1) * heat(H)$ // compute weights for coallocation sets corresponding to subsets of H.
    for $H' \subseteq H$
        if objects in H' are coallocatable
            $w'(H') = (|H'| - 1) * heat(H)$
        else
            $w'(H') = 0$ // attribute weights for coallocation sets avoiding double contributions,
    // by computing the maximal partition contribution for a coallocation set.
    for each coallocation set C
        $P = \{H'_i \mid w'(H'_i) > 0 \wedge S_{alloc}(H'_i) = S_{alloc}(H'_j) \wedge H'_i \subset H'_j \Rightarrow w'(H'_j) = 0\}$
        $w'(C) = \sum_{H'_i \in P} w'(H'_i)$ // normalize weights.
    for each coallocation set C
        $w(C) = w'(C)/w_{total}$ Reordered field-level layout 731

FIG. 9A

// first phase: compute normalized weights for fields coallocation sets according to reorder, // split, and merge coallocation conditions. The routine computeWeight is given above.

computeWeight(field reorder coallocatable, $w_r$)

computeWeight(object split coallocatable, $w_s$)

computeWeight(object merge coallocatable, $w_m$)

// second phase: approximate benefits for every placement technique at the granularity of object // allocation sites. $OBJ(X_i)$ gives the object allocation site for a given field allocation site, // i.e., $OBJ(X_i) = X$. We also extend OBJ to sets of field allocation sites.

for each object coallocation set $\vec{C}$ if $|\vec{C}| = 1$ // compute split + reorder benefits.

$$\vec{C}_{rWSP} = WSP(\vec{C}, \{\langle C, w_r(C)\rangle | OBJ(C) = \vec{C}\})$$

$$w_r(\vec{C}) = \sum_{C \in \vec{C}_{rWSP}} w_r(C)$$

$$w_m(\vec{C}) = w_r(\vec{C})$$

$$\vec{C}_{sWSP} = WSP(\vec{C}, \{\langle C, w_s(C)\rangle | OBJ(C) = \vec{C}\})$$

$$w_s(\vec{C}) = \sum_{C \in \vec{C}_{sWSP}} w_r(C)$$

$$w_{s \vee m} = \max(w_r(\vec{C}), w_c(\vec{C}))$$

else // $|\vec{C}| > 1$ merge candidates.

$$\vec{C}_{mWSP} = WSP(\vec{C}, \{\langle C, w_m(C)\rangle | OBJ(C) = \vec{C}\})$$

$$w_m(\vec{C}) = \sum_{C \in \vec{C}_{mWSP}} w_m(C)$$

$$w_{s \vee m}(\vec{C}) = w_m(\vec{C})$$

to Figure 9B

FIG. 9B from Figure 9A

⇓

// third phase: find field coallocation solutions and show potential benefit over a given
//layout. $R_l$ is potential cache miss reduction for a given layout.

$\hat{\Pi}_{rWSP} = WSP(OBJ(S_{alloc}(\Pi)), \{\langle \hat{C}, w_r \rangle \mid w_r(\hat{C}) > 0\})$ $R_l^r = (\sum_{C \in \hat{\Pi}_{rWSP}} w_r - R_l)/(1 - R_l)$ $\hat{\Pi}_{sWSP} = WSP(OBJ(S_{alloc}(\Pi)), \{\langle \hat{C}, w_s \rangle \mid w_s(\hat{C}) > 0\})$ $R_l^s = (\sum_{C \in \hat{\Pi}_{sWSP}} w_s - R_l)/(1 - R_l)$ $\hat{\Pi}_{mWSP} = WSP(OBJ(S_{alloc}(\Pi)), \{\langle \hat{C}, w_m \rangle \mid w_m(\hat{C}) > 0\})$ $R_l^m = (\sum_{C \in \hat{\Pi}_{mWSP}} w_m - R_l)/(1 - R_l)$ $\hat{\Pi}_{svmWSP} = WSP(OBJ(S_{alloc}(\Pi)), \{\langle \hat{C}, w_{svm} \rangle \mid w_{svm}(\hat{C}) > 0\})$ $R_l^{svm} = (\sum_{C \in \hat{\Pi}_{svmWSP}} w_{svm} - R_l)/(1 - R_l)$ output $R_l^r, R_l^s, R_l^m, R_l^{svm}$

FIG. 10A $H_1 = a_{1,1} a_{3,3} a_{1,6} a_{3,8}$        $H_2 = a_{2,2} b_{1,4} c_{2,10}$

| ht | stream | coallocatable object fields | mr | coallocation set | w' |
|---|---|---|---|---|---|
| 0.8 | $H_1$ | $a_{1,1}, a_{3,3}$ (R) | 1 | $\{A_1, A_3\}$ | 0.8 |
| | | $a_{1,6}, a_{3,8}$ (R) | 1 | $\{A_1, A_3\}$ | 0.8 |
| | | $a_{3,3}, a_{1,6}$ (S) | 1 | | |
| | | $a_{1,1}, a_{1,6}$ (S) | 1 | $\{A_1\}$ | 0.8 |
| | | $a_{3,3}, a_{3,8}$ (S) | 1 | $\{A_3\}$ | 0.8 |
| | | $a_{1,1}, a_{3,3}, a_{1,6}$ (S) | 2 | | |
| | | $a_{3,3}, a_{1,6}, a_{3,8}$ (S) | 2 | | |
| | | $a_{1,1}, a_{3,3}, a_{1,6}, a_{3,8}$ (S) | 3 | $\{A_1, A_3\}$ | 2.4 |
| 0.2 | $H_2$ | $a_{2,2}, b_{1,4}$ (M) | 1 | $\{A_2, B_1\}$ | 0.2 |
| | | $a_{2,2}, c_{2,10}$ (M) | 1 | $\{A_2, C_2\}$ | 0.2 |
| | | $b_{1,4}, c_{2,10}$ (M) | 1 | $\{B_1, C_2\}$ | 0.2 |
| | | $a_{2,2}, b_{1,4}, c_{2,10}$ (M) | 2 | $\{A_2, B_1, C_2\}$ | 0.4 |

FIG. 10B

| coallocation set | accumulated miss reduction | normalized miss reduction |
|---|---|---|
| $\{A_1, A_3\}$ (S) | 2.4 | 0.86 |
| $\{A_1, A_3\}$ (R) | 1.6 | 0.57 |
| $\{A_1\}$ (S) | 0.8 | 0.29 |
| $\{A_3\}$ (S) | 0.8 | 0.29 |
| $\{A_2, B_1\}$ (M) | 0.2 | 0.07 |
| $\{A_2, C_2\}$ (M) | 0.2 | 0.07 |
| $\{B_1, C_2\}$ (M) | 0.2 | 0.07 |
| $\{A_2, B_1, C_2\}$ (M) | 0.4 | 0.14 |

| method | site(s) | field set packing | mr |
|---|---|---|---|
| (R) | A | $\{A_1, A_3\}, \{A_2\}$ | 0.57 |
| (S) | A | $\{A_1, A_3\}, \{A_2\}$ | 0.86 |
| (M) | A, B | $\{A_2, B_1\}, \{A_1, A_3, B_2\}$ | 0.07 |
| (M) | A, C | $\{A_2, C_2\}, \{A_1, A_3, C_1\}$ | 0.07 |
| (M) | B, C | $\{B_1, C_2\}, \{B_2, C_1\}$ | 0.07 |
| (M) | A, B, C | $\{A_2, B_1, C_2\}, \{A_1, A_3, B_2, C_1\}$ | 0.14 |

| method | set packing | mr |
|---|---|---|
| r | A | 0.57 |
| s | A | 0.86 |
| m | A, B, C | 0.14 |
| s V m | split A, merge B, C | 0.93 | s V m layout

FIG. 12A

| bench-mark | input | # refs | abstraction | # addr | # streams | % hot ref | %hot addr |
|---|---|---|---|---|---|---|---|
| boxsim | -n 20 -s 1 | 34580784 | object | 44635 | 325 | 90.83 | 0.13 |
|  |  |  | field | 295550 | 3255 | 85.70 | 0.56 |
| twolf | test | 39299577 | object | 9447 | 2906 | 87.40 | 6.11 |
|  |  |  | field | 15373 | 7376 | 87.84 | 19.83 |
| vpr | test | 91417261 | object | 3884 | 986 | 97.99 | 4.20 |
|  |  |  | field | 18810 | 6327 | 95.04 | 29.96 |
| mcf | test | 24326874 | object | 55 | 90 | 99.96 | 7.27 |
|  |  |  | field | 19466 | 2975 | 84.35 | 21.95 |
| mst | -t 1000 | 16332568 | object | 1001058 | 7014 | 58.25 | 0.20 |
|  |  |  | field | 1255059 | 5389 | 24.23 | 0.32 |
| health | 4 2000 | 176371104 | object | 172014 | 66166 | 94.40 | 53.83 |
|  |  |  | field | 574638 | 80354 | 90.79 | 22.85 |

FIG. 12B

| bench-mark | sites | hot | object | reorder | merge | split | split or merge | split and merge | field hot | field sites |
|---|---|---|---|---|---|---|---|---|---|---|
| boxsim | 83 | 24 | 16 | 14 | 17 | 21 | 23 | 24 (109) | 131 | 516 |
| twolf | 141 | 27 | 24 | 7 | 15 | 13 | 19 | 19 (57) | 69 | 200 |
| vpr | 54 | 19 | 14 | 6 | 10 | 6 | 10 | 10 (26) | 36 | 74 |
| mcf | 10 | 4 | 2 | 1 | 1 | 3 | 3 | 2 (11) | 16 | 24 |
| mst | 13 | 5 | 2 | 2 | 3 | 5 | 5 | 5 (13) | 14 | 19 |
| health | 11 | 3 | 2 | 2 | 3 | 3 | 3 | 3 (10) | 13 | 40 |

CACHE-CONSCIOUS COALLOCATION OF HOT DATA STREAMS

RELATED APPLICATION INFORMATION

This application claims the benefit of U.S. Provisional Patent Application Ser. No. 60/465,917, filed Apr. 25, 2003, the disclosure of which is hereby incorporated by reference.

TECHNICAL FIELD

The invention relates generally to cache memory performance. More specifically, it relates to improving cache memory performance by coallocating objects and/or object fields from hot data streams.

BACKGROUND

Software performance is directly linked to memory performance and processor speed. A processor is the part of a computer which controls the other parts. A processor typically includes units for fetching instructions and processing them to produce signals which control the other parts of the computer. The speed of a processor affects how quickly the processor performs operations. Computer memory, in a general sense, is a medium or device that can hold data in a format that the processor can use. The data in computer memory usually include computer instructions as well as data operated upon according to the computer instructions.

In a general sense, data stored in memory is often organized into data objects, which may in turn include attributes or fields. Data objects can correspond to a wide variety of data items or data structures, such as program variables and constants, arrays, records, or other aggregate data structures.

One way to improve the performance of software on computer systems is to install large amounts of fast memory. However, installing large amounts of fast memory is expensive—generally, the faster the memory, the more expensive it is. In addition, larger memory is generally slower to access than smaller memory due to the lookup circuitry. So, even if fast memory is cheap, smaller memory will still be faster than larger memory, and there will still be a memory hierarchy. An economical solution to this problem is to have a memory hierarchy within the computer system, which takes advantage of the cost/performance benefit of different memory technologies. The hierarchy is based on memories of different speeds and sizes, which are organized into several levels, each smaller, faster, and more expensive per byte than the next level. To work correctly, the levels of the hierarchy usually encompass one another. For example, all of the data at the fastest, topmost level in the hierarchy is also found in the level below it, and so on, until the bottom level of the hierarchy. Ideally, the memory system appears to work almost as fast as the fastest memory, yet does not cost much more than the cheapest memory.

The importance of the memory hierarchy has increased with advances in processor (CPU) performance. CPU performance has improved and continues to improve at a dramatic rate (performance nearly doubles every other year). Memory chip performance, on the other hand, has progressed much slower. As a result, there has been a widening processor-memory performance gap.

I. Cache Memory

In the memory hierarchy, cache memory is the name generally given to the first, topmost level of memory encountered by a processor. It is typically the fastest memory in terms of performance, as well as the most expensive per byte. Some processors have separate caches for instructions and other data, where both can be active at the same time. Caches can use various kinds of addressing (e.g., direct mapped, fully associative, set associative). Effective cache memory utilization is an important determinant of overall program performance and may help bridge the processor-memory performance gap. Thus, improving cache memory performance is vital to software performance.

More specifically, cache memory is typically small, fast memory holding recently accessed data, designed to speed up subsequent access to the same data. In usual operations, for example, when data is read from or written to main memory, a copy is also saved in the cache along with the associated main memory address. The system monitors addresses of subsequent reads to see if the data is already in the cache. If the data is already in the cache (called a cache hit), then the data is returned immediately and the main memory read is aborted (or not started). If the data is not cached (called a cache miss), then the data is fetched from main memory and also saved in the cache, which can be time-consuming and can cause processing to wait for the data to be loaded. In fact, the cache is built from faster memory chips than main memory so a cache hit takes much less time to complete than a normal memory access. Moreover, the cache may be located on the same integrated circuit as the CPU in order to further reduce the access time. In this case, the cache is often known as "primary" since there may be a larger, slower secondary cache (i.e., a lower level in the hierarchy) outside the CPU chip.

When the cache is full and it is desired to cache another block of data then a cache entry is selected to be written back to main memory or "flushed." The new block is then put in its place. Which entry is chosen to be flushed is determined by a replacement algorithm.

An important characteristic of a cache is its hit rate—the fraction of all memory accesses which are satisfied from the cache. The hit rate depends on the cache design as well as its size relative to the main memory. The size is limited by the cost of fast memory chips. The hit rate also depends on the access pattern of the particular program being run (the sequence of addresses being read, written, etc.). Conventionally, caches rely on two properties of the access patterns of most programs: (1) temporal locality—if something is accessed once, it is likely to be accessed again soon; and (2) spatial locality—if one memory location is accessed, then nearby memory locations are likely to be accessed. In order to exploit spatial locality, caches often operate on several words (units of storage in a computer) at a time—a "cache line" or "cache block." Main memory reads and writes are whole cache blocks.

A cache block is the smallest unit of memory that can be transferred between the memory and the cache. Rather than reading a single word or byte from main memory at a time, each cache entry usually holds a certain number of words, and a whole block is read and cached at once. This takes advantage of the principle of spatial locality: if one location is read, then nearby locations (particularly, following locations) are likely to be read soon afterward.

When a computer program is running on a computer, instructions and data for the computer program are laid out in memory. The layout of instructions and data in memory can affect cache performance. In a good memory layout, instructions/data that are accessed around the same time during program execution are located close together in computer memory, which makes them more likely to be in the same cache block, increasing the cache hit rate. In a poor memory layout, instructions/data that are accessed around the same time during program execution are not located close together in computer memory, leading to more cache misses and more normal (slower) memory accesses.

Certain metrics are used to determine the effectiveness of a memory layout, in addition to the metrics of cache hits, misses, and hit rate (which are discussed above). These other metrics used include miss rate, miss penalty, and miss reduction. Cache miss rate is the fraction of accesses that are not in cache memory. Miss penalties are the additional time required to service a cache miss (e.g., to perform a normal, non-cache memory access). Cache miss reductions indicate the number or proportion of misses that could be avoided based on a given layout.

II. Exploring Different Memory Layouts

Various software tools have been developed to analyze and suggest particular memory layouts for computer programs. Memory and cache behavior studies of general-purpose programs indicate that a small fraction of data objects (around 10%) are responsible for most data references and cache misses (around 90%). For example, see the articles: (1) Chilimbi, "Efficient Representations and Abstractions for Quantifying and Exploiting Data Reference Locality," SIGPLAN Conf. on Prog. Lang. Design and Impl., June 2001 ("Chilimbi 1"); and (2) Rubin et al., "An Efficient Profile-analysis Framework for Data Layout Optimizations," Symp. on Princ. of Prog. Lang., January 2002 ("Rubin"). Data objects that are accessed relatively frequently are called "hot" data objects. These hot data objects are attractive targets for cache locality optimizations since rearranging these hot data objects in memory can reduce cache miss rates.

While cache-conscious data placement techniques exist, they generally suffer from two primary drawbacks. First, their memory placement decisions are guided by object/field frequency or pairwise affinity profiles, which only provide rough approximations of a program's temporal data reference behavior (the way objects, variables, and other data are accessed by a program over time). Also, their layout decisions are determined by fairly ad-hoc heuristics. These drawbacks seriously limit performance because layouts guided by inexact profiles may be far from optimal. Moreover, prior layout heuristics generally are not both robust and effective (i.e., they do not work consistently well for a wide variety of programs).

Object frequency profiles, for example, typically rely on processor access history to make caching decisions and keep the most frequently used objects in cache. Towards the end of execution, object frequency profiles typically cannot find an optimal cache layout solution because some objects may accumulate large reference counts and never become candidates for replacement, even if the objects are no longer active. Aging techniques counterbalance the accumulation effect, but they add additional levels of complication to the profile.

A pairwise affinity profile maintains information on how many cache misses would be caused if a pair of objects are mapped to the same cache block. One drawback is that the profile limits the number of objects it evaluates to two. Moreover, to find an optimal solution, a pairwise affinity profile needs to compute every combination of object pairings and the effects of the object pairings on the overall cache layout. These computations require intensive and complicated heuristics that may ultimately result in failing to find a good solution for many kinds of caches.

Some related works that attempt to solve memory performance issues include the articles: (1) Seidl and Zorn, "Segregating Heap Objects by Reference Behavior and Lifetime," Eighth Intl. Conf. on Arch. Support for Prog. Lang. and Operating Sys., pages 12-23, October 1998 ("Seidl"); (2) the Rubin article; (3) Chilimbi et al., "Cache-conscious Structure Layout," SIGPLAN Conf. on Prog. Lang. Design and Impl., May 1999 ("Chilimbi 2"); and (4) Calder et al., "Cache-conscious Data Placement," Eighth Intl. Conf on Arch. Support for Prog. Lang. and Operating Sys., pages 139-149, October 1998 ("Calder").

The Seidl article describes allocating heap objects in four pre-defined memory "arenas" based on a predicted hit-miss ratio. The four arenas are four different areas of memory, labeled highly referenced, not-highly reference, short lived, and other. In a similar fashion, the Rubin article describes using a search-based learning technique to classify heap objects according to runtime characteristics such as allocation calling context, object size, and other like characteristics. The Rubin article also describes, based on this classification, allocating objects in separate heap arenas. The techniques in the Seidl and Rubin articles improve virtual memory performance by increasing page utilization. The problem with these prior art references, however, is that they limit the number of memory arenas used for allocations, they emphasize individual objects over streams of data, and, ultimately, have little, if any, impact on cache performance because their coallocation analysis and/or enforcement techniques are too coarse (i.e., they address chunks of data too large) to efficiently coallocate objects for benefits at the cache level.

The Chilimbi 2 article describes ccmalloc, a cache-conscious heap allocator that uses programmer annotations to allocate contemporaneously accessed data objects to be in the same cache block. One major drawback to this technique is that it requires programmer intervention—the programmer manually places the annotations in the software, which can be time-consuming. Another drawback is that the technique requires that the programmer accurately assess the run-time behavior of the software, which may be difficult to discern for some scenarios and may change in different scenarios.

Calder describes applying placement techniques developed for instruction caches to data. Specifically, Calder describes a compiler-directed approach that creates an address placement scheme for stack variables, global variables, and heap objects in order to reduce data cache misses. Calder describes calculating a temporal relationship graph ("TRG"). The TRG improves performance for stack objects and global variables but does little to improve the caching performance of heap objects. Further, drawbacks to the TRG include the fact that the TRG does not use hot data stream profiles and that it depends on an arbitrary temporal reference window size, which may not improve cache miss rates for some programs. For additional details, see the respective papers.

Thus, in contrast to prior cache-conscious data placement techniques and tools, techniques and tools are needed that produce a good memory layout in terms of cache performance, that effectively use global temporal access information for programs, that effectively cluster objects together for different kinds of caches, that lead to significant cache miss reductions in practice, and that do not rely on ad-hoc heuristics.

SUMMARY

Techniques and tools are presented herein for profile-based analysis aimed at coallocating contemporaneously accessed objects and/or fields. The analysis results in effective and reliable memory layouts in terms of cache performance and leads to significant cache miss reductions in practice. The various techniques and tools can be used in combination or separately.

According to a first aspect, a tool such as a coallocation tool receives a temporal data reference profile and detects hot data streams in it. The tool analyzes the hot data streams and the profile to determine a coallocation solution for allocations in heap memory. This enables cache-conscious coallocation of elements such as objects or object fields in the hot data streams during subsequent execution of a computer program, for example, by isolating and directing allocations of the hot data streams to areas of memory.

According to a second aspect, a tool such as a coallocation tool receives a profile of object field accesses and determines a coallocation solution from the profile. The coallocation solution increases the locality of object fields in memory to improve cache performance, especially since object fields are small and more likely to fit with other object fields in a single cache block.

According to a third aspect, a tool such as a coallocation tool receives a comprehensive temporal data access profile for a computer program and detects data access patterns in it. The tool analyzes the patterns and profile to determine a coallocation solution for allocations in memory. The coallocation solution may include object restructuring by reordering fields of objects, splitting objects, and/or merging objects. Such restructuring techniques improve subsequent cache-conscious coallocation.

According to a fourth aspect, a tool such as a coallocation tool includes an analysis module for determining a coallocation solution and an instrumentation module for automating alteration of a computer program based upon the coallocation solution. The tool also includes an enforcement module for automatically enforcing the coallocation solution during execution of the altered computer program. In this way, the tool simplifies the alteration of the computer program and enforcement of the coallocation solution.

Additional features and advantages of the invention will be made apparent from the following detailed description of embodiments that proceeds with reference to the accompanying drawings.

BRIEF DESCRIPTION OF THE DRAWINGS

FIG. 3A is a chart showing the results of hot data stream analysis.

FIG. 3B is a chart showing accumulated and normalized coallocation set miss reductions.

FIG. 3C is a chart showing possible partitions of allocation sites, in terms of weighted set packings.

FIG. 3D is a block diagram of a layout for the top set packing in FIG. 3C.

FIG. 5A is a pseudocode listing for an algorithm for coallocating hot data streams.

FIG. 5B is a pseudocode listing for an algorithm for computing weights for coallocation sets.

FIGS. 9A and 9B are a pseudocode listing for an algorithm for field coallocation.

FIG. 10A is a chart showing analysis of coallocatable object fields and coallocation sets for hot data streams on a field access trace.

FIG. 10B is a chart showing the accumulated and normalized cache miss reductions due to object field coallocation.

FIGS. 12A-12F are charts showing results with respect to several benchmark computer programs.

DETAILED DESCRIPTION

Figure 1:
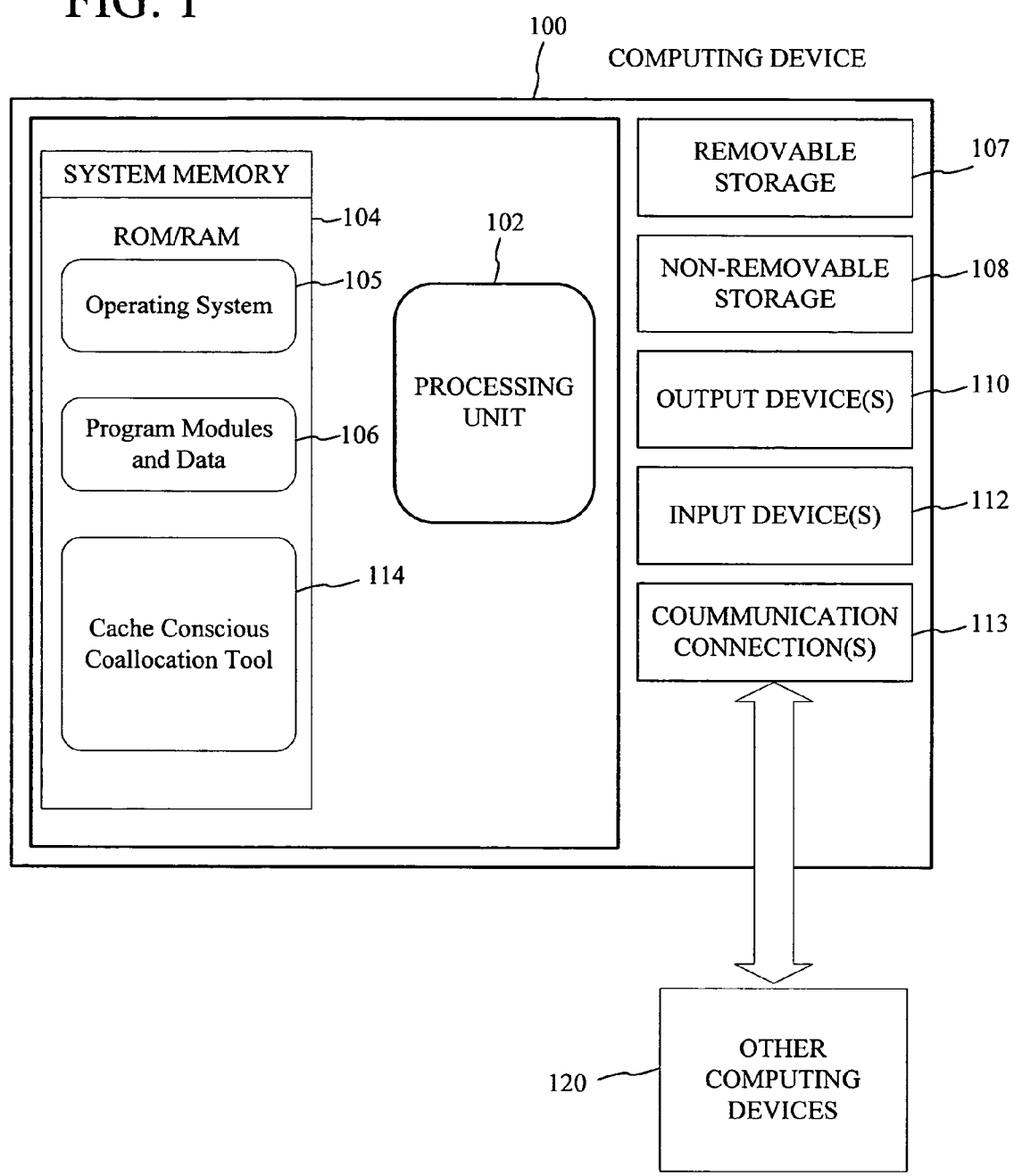
FIG. 1 is a block diagram of a suitable computing system for implementing described embodiments.

The following description is directed to techniques and tools for improving cache memory performance. Described embodiments improve memory system performance by coallocating contemporaneously accessed heap objects. The techniques and tools use relatively precise global temporal profile information that is nevertheless both cheap to collect and relatively stable across different program runs. In addition, the techniques and tools use an efficient polynomial approximation algorithm to process the profile information and produce a good data layout, rather than rely on ad-hoc heuristics.

The techniques include profile-based analysis for producing an effective memory layout for a program. The heap is divided into multiple sequentially allocated arenas, and an analysis tool achieves cache-conscious coallocation of a hot data stream H by isolating and directing allocation sites of H to the same sequentially allocated arena such that intervening allocations coming from other sites are separated. The coallocation solution produced by the analysis is enforced by an automatic tool that redirects a program's heap allocations to a run-time coallocation library.

The techniques and tools extend to coallocation at object field granularity. The resulting field coallocation solution generalizes common data restructuring techniques, such as field reordering, object splitting, and object merging. Furthermore, use of the techniques and tools yields insight into object restructuring by breaking down the coallocation benefit on a per-technique basis, which provides the opportunity to pick the "sweet spot" for each program.

Initial results on a suite of memory-performance-limited benchmarks, including a few SPECint2000 programs, indicate that programs possess significant coallocation opportunities and that field coallocation can dramatically reduce L2 cache misses by up to 40% and produce execution time improvements of up to 22%.

While the techniques and tools are described in places herein as part of a single, integrated system, the techniques can be applied separately, potentially in combination with other techniques.

In some embodiments, the techniques described herein are implemented after compile time but before run time. In other embodiments, the techniques are implemented at design time, compile time, or runtime.

In some embodiments, the techniques and tools described herein work with hot data streams. A hot data stream is a set of two or more data references that repeats relatively frequently. Various embodiments focus on objects or object fields in hot data streams since such objects/fields fit into that category of frequent accesses that are only a small fraction of all of the data objects/fields in a program. However, it should be understood that other implementations may extend to other environments and definitions as well.

In some embodiments, a cache-conscious coallocation tool performs various techniques. Although the operations for these techniques are typically described in a particular, sequential order for the sake of presentation, it should be understood that this manner of description encompasses minor rearrangements in the order of operations, unless a particular ordering is required. For example, operations described sequentially may in some cases be rearranged or performed concurrently. Moreover, for the sake of simplicity, flowcharts typically do not show the various ways in which particular techniques can be used in conjunction with other techniques.

I. Computing System

FIG. 1 illustrates an exemplary system for practicing the invention according to one or more embodiments. As seen in FIG. 1, the system includes computing device 100. In a very basic implementation, computing device 100 typically includes at least one processing unit 102 and system memory 104. Processing unit 102 includes single physical processors, multiple processors acting together, virtual processors, and any other device or software program capable of interpreting and executing computer instructions. Depending on the exact implementation and type of computing device, system memory 104 may be volatile (such as RAM), non-volatile (such as ROM, flash memory, etc.), or some combination of the two, in various levels of a memory hierarchy. System memory 104 typically stores software and data for an operating system 105, one or more program modules with their associated data 106, and a cache-conscious coallocation tool 114.

Computing device 100 may also have additional features or functionality. For example, computing device 100 may also include additional data storage devices (removable and/or non-removable) such as magnetic disks, optical disks, or tape. Such additional storage is illustrated in FIG. 1 by removable storage 107 and non-removable storage 108. Computer storage media may include volatile and non-volatile, removable and non-removable media implemented in any method or technology for storage of information, such as computer readable instructions, data structures, program modules, or other data. System memory 104, removable storage 107, and non-removable storage 108 are all examples of computer storage media. Computer storage media include, but are not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store information and which can be accessed by computing device 100. Computing device 100 may also have input device(s) 112 such as keyboard, mouse, pen, voice input device, touch input device, etc. Output device(s) 110 such as a display, speakers, printer, and the like may also be included. All these devices are known in the art and need not be discussed at length here.

Computing device 100 may also include communications connection(s) 113 that allow the device to communicate with other computing devices 120, such as over a network. Communications connection(s) 113 is an example of communication media, which typically convey computer readable instructions, data structures, program modules, or other data in a modulated data signal such as a carrier wave or other transport mechanism and includes any information delivery media. The term "modulated data signal" means a signal that has one or more of its characteristics set or changed is such a manner as to encode information in the signal. By way of example, and not limitation, communication media includes wired media such as a wired network or direct wired connections, and wireless media such as acoustic, RF, infrared, and other wireless media. The term computer readable media as used herein includes both storage media and communication media.

Embodiments can be described in the general context of computer-executable instructions, such as those included in program modules, being executed in a computing system on a target real or virtual processor. Generally, computer programs and program modules include routines, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the application uses terms like "determine," "generate," "adjust," and "apply" to describe computer operations in a computing system. These terms are high-level abstractions for operations performed by a computer, and should not be confused with acts performed by a human being. The actual computer operations corresponding to these terms vary depending on implementation.

II. Overview—Cache-conscious Coallocation

Memory system performance is improved by coallocating contemporaneously accessed heap objects into memory arenas using a robust and efficient algorithm. This is accomplished using relatively precise global temporal profile information that is nevertheless both cheap to collect and relatively stable across different program runs. In addition, this is accomplished using an efficient polynomial approximation algorithm to process the profile information and produce a good data layout, rather than relying on ad-hoc heuristics. In addition to introducing concepts such as "allocation" of an object from a "heap," this section provides an example of cache-conscious coallocation and a summary of the tools and techniques presented in detail in other sections.

A heap object is a data object allocated from "heap" memory. The "heap" is an area of memory used for dynamic memory allocation, where blocks of memory are typically allocated and freed in an arbitrary order, and the pattern of allocation and size of blocks may not be known until run-time. Typically, a program has one heap which it may use for several different purposes. In fact, a heap is required by some languages in which functions can return arbitrary data structures or functions with free variables. In the programming language C, the functions malloc and free provide access to the heap. Other languages have the same or similar functions, or perform dynamic memory allocation in a more automatic manner. The function malloc is supported by a standard C library routine for storage allocation. Malloc takes the number of bytes to be allocated and returns a pointer to a block of memory that size. Storage is allocated from a heap, which lies after the end of the program and data areas. Following good programming practice, memory allocated with malloc is freed explicitly using the "free" routine, and can then be re-used. Allocation sites are the sites in a program at which the program allocates memory.

There are various ways to capture or model temporal data reference profiles for programs. For example, recent research shows how to efficiently capture accurate temporal data reference profiles. The Chilimbi 1 article describes a whole program stream ("WPS"). A WPS is a compact yet complete representation of a program's data reference behavior. WPS representation explicitly encodes regular access patterns and permits efficient extraction of hot data streams, which are sets of consecutive data references that relatively frequently repeat.

A. Example

Cache-conscious coallocation of a hot data stream H can be achieved by isolating and directing allocation sites of H's data members (i.e., the objects that are members of the hot data stream H) to a sequentially allocated arena, such that intervening allocations coming from other sites are separated. The heap is divided into multiple sequentially allocated arenas, and an analysis tool determines which allocation sites to direct to the same arena to achieve coallocation, and which allocation sites prevent or hinder coallocation and should be isolated in a separate arena. Objects in hot data streams typically incur most of the cache misses, but are small fraction of all data objects.

Figure 2A:
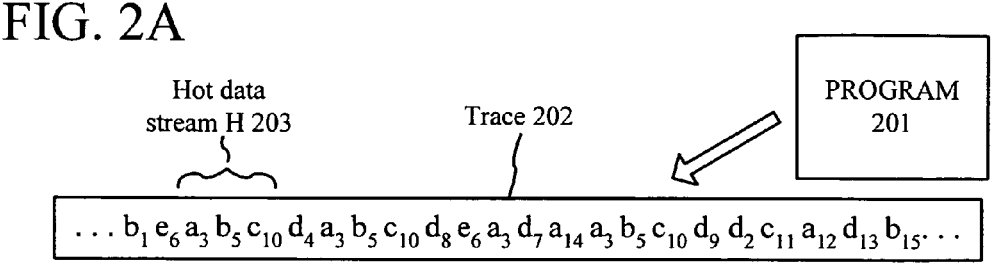
FIG. 2A is a block diagram of a data reference trace that includes hot data streams.

FIG. 2A shows a portion of a data reference trace 202 of a computer program 201. FIG. 2A uses the following convention: object $x_i$ is allocated at allocation site X (or calling context X) and is the $i^{th}$ global allocation request in the program. For example, the object $b_1$ is allocated at allocation site B, and this is the first object allocation in the program. The object $e_6$ is the sixth allocation request in the program, and this object is allocated at allocation site E. The trace 202 reflects a part of execution that occurs after the data objects have been allocated, which is why earlier allocated objects appear after later allocated objects in the trace 202.

The data reference trace 202 contains a hot data stream H 203. The hot data stream H 203 has the members $a_3$, $b_5$, and $c_{10}$. Allocation sites A, B, and C allocate objects $a_3$, $b_5$, and $c_{10}$, respectively, along with other objects that are not part of the hot data stream H 203. Coallocating the data objects of the hot data stream H 203, which are frequently accessed contemporaneously during the trace 202, can significantly reduce cache misses, especially if H fits in a cache block.

Figure 2B:
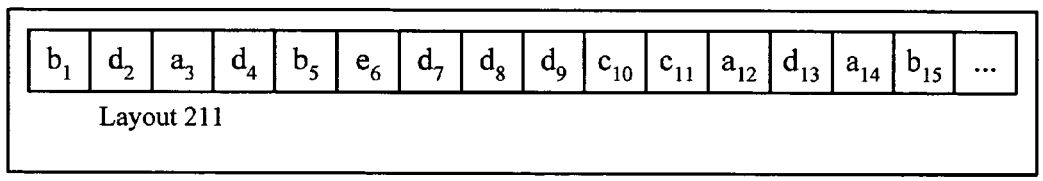
FIG. 2B is a block diagram of a data layout in which objects are placed contiguously in allocation order.

FIG. 2B shows an example data layout 211 in heap memory of system memory, which assumes objects are small and thus placed contiguously according to the order by which the objects were allocated in the program. Each subsequent object is allocated sequentially. The object allocated first ($b_1$) is followed by the object allocated second ($d_2$), which is followed by the object allocated third ($a_3$), etc.

The objects $a_3$, $b_5$, and $c_{10}$ that make up the hot data stream H 203 are not placed contiguously in memory in this layout 211. This layout 211 is likely to be inefficient since, following it, the objects $a_3$, $b_5$, and $c_{10}$ probably will not be in a single cache block. The objects $a_3$, $b_5$, and $c_{10}$ are separated by other objects (from allocation sites D and E) in the layout 211. Depending on factors such as cache block size and object size, $a_3$, $b_5$, and $c_{10}$ may be in three different cache blocks, or $a_3$ and $b_5$ may be in a different block than $c_{10}$, or there may be some other configuration. Thus, the layout 211 likely will result in cache misses and extra non-cache memory access operations to access the objects in the hot data stream.

Figure 2C:
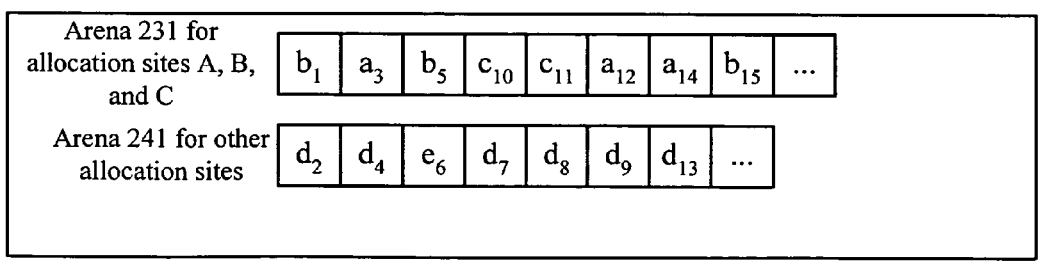
FIG. 2C is a block diagram of a layout after cache-conscious coallocation.

FIG. 2C shows a memory layout in which co-location of the objects in H is achieved. To enable this layout, allocation requests from sites A, B, and C are isolated and directed to a first sequentially allocated arena 231, while allocation requests from other sites (i.e., D and E) are separated and directed to a different arena 241. Though other objects allocated at the sites A, B, and C are also placed in the same heap arena 231 as the hot data stream objects, this is acceptable as far as the objective to co-locate hot data stream objects. (It is not always possible to co-locate hot data stream members in this fashion. For example, if $a_3$ $d_7$ $a_{14}$ was a hot data stream, intervening allocations of objects allocated at the allocation sites A and D (e.g., objects $d_4$ and $a_{12}$) would not be separated, preventing cache-conscious coallocation.)

B. Summary of Tools, Techniques, and Conclusions

In some embodiments, a profile-based analysis tool produces a cache-conscious coallocation of heap objects that participate in hot data streams, when possible. Optimal coallocation can be reduced to a weighted set packing ("WSP") problem, which is known to be NP hard. Hence, the tool uses the best known polynomial time approximation to the WSP problem to arrive at the object coallocation solution. Alternatively, a profile-based analysis tool uses other and/or additional techniques for analysis.

In some embodiments, an instrumentation tool replaces a program's heap allocation requests with calls to a run-time coallocation library to enforce the coallocation solution layout. For example, suppose a computer program includes the following lines:

int * buffer;
    buffer=(int *) malloc (sizeof (int1));

where "buffer" is a pointer and malloc is a memory allocation function that returns a pointer to a block of memory that here is the size of the variable int1. The tool makes the following change to the second line:

buffer=(int *) comalloc$_i$ (sizeof (int1));

where comalloc$_i$ is a call to a particular routine that causes the allocation to be in the $i^{th}$ arena. The tool enforces the coallocation solution in FIG. 2C by replacing allocations at sites A, B, and C with calls to comalloc$_i$, and replacing allocations at other sites (including sites D and E) with calls to comalloc$_0$. Each comalloc$_i$ routine manages a separate heap arena where consecutively allocated objects are coallocated. Alternatively, an instrumentation tool uses other and/ or additional techniques for instrumentation, for example, replacing a program's heap allocation request in some other way at the programming stage, compile time, after compile time but before run time, or at run time. Or, the run-time allocation libraries use a different technique. For example, instead of having a different comalloci routine per arena, some other combination of routines manages the arenas.

Unfortunately, object coallocation cannot always be fully exploited on current machines, where cache blocks are often only 32 bytes. Next-generation machines may offer greater opportunities (e.g., the Pentium 4 and the Itanium have 128 byte L2 cache blocks). Previously, this has been addressed by rearranging objects at a field granularity using techniques such as field reordering, hot/cold structure splitting and merging structures.

In some embodiments, extending the analysis tool to analyze coallocation at a field granularity produces significantly larger cache miss rate reductions. Since coallocating fields is a generalization of the combination of object field reordering, object splitting, and object merging, this analysis permits estimating the contribution of each individual technique to the field coallocation solution. Restrictions on field rearrangements yield a spectrum of coallocation solutions, which tradeoff ease of layout enforcement (especially for non-typesafe languages such as C, C++) versus larger cache miss rate reductions. Promisingly, in several cases most of the benefits of the general solution (arbitrary field rearrangement) can be achieved with a subset of these standard field restructuring techniques. In addition to significant cache miss rate improvements, these field coallocation solutions produce execution time improvements of up to 22% on current machines for a suite of memory-performance-limited benchmarks.

In summary, the contributions of this application include, but are not limited to:

(1) A novel and efficient profile-based analysis for cache-conscious coallocation of hot heap objects that are contemporaneously accessed.

(2) An extended analysis for coallocation at field granularity. The analysis generalizes common data restructuring techniques, such as field reordering, object splitting and object merging. Furthermore, it provides insight into object restructuring by breaking down the benefit on a per technique basis, which provides programmers with the opportunity to pick the "sweet spot" for each program.

(3) An automatic implementation of object coallocation and a semi-automatic implementation of field coallocation (for non-typesafe languages such as C, C++) that shows that programs have significant coallocation opportunities and benefit both in terms of cache miss rate reduction and execution time improvement.

III. Coallocating Objects

This section describes techniques for coallocating heap objects that participate in hot data streams. First, the section briefly reviews hot data stream construction, introduces terminology and metrics for hot data streams, and discusses a simple model to estimate the benefits of coallocation. Next, the section describes when hot data stream objects may be coallocated. Finally, a cache-conscious object coallocation algorithm is presented.

A. Hot Data Streams

A hot data stream is a frequently repeated set of data references (in other words, a frequent data access pattern). The Chilimbi 1 article describes using a compression algorithm called Sequitur to construct a compact context-free grammar representation of a data reference trace, which could then be efficiently analyzed to detect hot data streams.

In one implementation, the "heat" of a data stream is its length (number of references in the data stream) multiplied by its frequency (number of time the data stream occurs in a trace).

A minimal hot data stream has at least the minimal prefix (exceeding length 1) of a hot data stream, with a heat c or more. The hot data stream analysis presented in the Chilimbi 1 article detects a set B of non-overlapping, minimal hot data streams such that references to stream elements in B yield P% coverage of all trace references. P is implementation dependent. For example, P=90%. The size of hot data streams detected by the analysis is also adjustable and implementation dependent. For example, the analysis is set to detect minimal hot data stream that contain at least 2 and not more than 20 elements. While longer hot data streams offer more coallocation opportunities, they also increase the computational cost of the coallocation analysis.

The analysis also computes the normalized heat value for each hot data stream in B, such that a hot data stream H with normalized heat value $H_c$ covers $H_c$% of the reduced trace. In other words, H covers (P*$H_c$)% of the original trace.

For the purpose of coallocating hot data stream members contiguously to improve cache performance, the exact order of objects in a hot data stream makes little difference. Ignoring the order also provides more coallocation opportunities. Hence, hot data streams may actually be sets of data references in arbitrary order, which are still considered and termed hot data streams. In addition, the analysis ignores global variable references.

B. Avoiding Cache Misses by Coallocation

FIG. 2B shows a sequence of objects allocated by a program during execution. In some embodiments, the focus is on "linearizing" the layout to the access pattern and ignores both object and cache block size. The goal is to achieve a robust solution on a variety of machines with different cache architectures rather than tune a layout to a particular cache configuration.

FIGS. 3A-3D are an elaboration of FIGS. 2A-2C. FIG. 3A shows the result of the hot data stream analysis. As shown in the normalized heat column ("ht"), the hot data stream $a_3$ $b_5$ $c_{10}$ covers 60% of the reduced trace, the data stream $d_4$ $b_{15}$ $e_6$ covers 30% of the reduced trace, and the data stream $e_6$ $d_4$ $a_{12}$ $a_{14}$ covers 10% of the reduced trace. (FIG. 3A shows results of analysis of a trace with several hundred data references, a portion of which is shown in FIG. 2A.)

Improvements in performance may be deduced from the data. In a worst-case scenario, every stream data access can cause a cache miss. Compared to the worst-case scenario, coallocating $b_5$ and $c_{10}$ in the same arena could save one cache miss for every occurrence of the stream $a_3$ $b_5$ $c_{10}$ (as shown in the misses reduced column "mr"), assuming $b_5$ and $c_{10}$ fit in one cache block. Coallocating $a_3$, $b_5$, and $c_{10}$ saves two cache misses if those objects fit in one cache block. For a more realistic estimate of the relative benefits of cache miss reduction due to coallocation, one can compute the potential cache miss reduction for two other layouts versus the worst-case scenario, and then compare the miss reduction benefits for the different layouts. The two other layouts are (i) the original layout produced by the current heap allocator, and (ii) the layout produced if all objects are allocated contiguously according to allocation order.

C. Coallocatable Objects

In general, the member objects of a hot data stream H can be coallocated if all intervening allocations between members of H come from allocations sites other than the ones used to allocate members of H. For example, with reference to FIGS. 2A, 2B, and 3A, the objects $b_5$ and $c_{10}$ (that come from allocation sites B and C, respectively) are coallocatable since the intervening allocations of $e_6$, $d_7$, $d_8$, and $d_9$ come from other allocation sites (namely, D and E). On the other hand, $d_4$ and $b_{15}$, which are in a hot data stream $d_4$ $b_{15}$ $e_6$, are not coallocatable since $d_7$ (and also $d_8$ and $d_9$) is an intervening allocation that comes from D, which allocates $d_4$ in H.

Even if all members of H cannot be coallocated, it may be possible to coallocate some of them; thus the algorithm presented in the next sub-section considers coallocatable objects in a sub-stream of a hot data stream H.

More formally, objects in H are coallocatable if, for every program object $X_t \notin H$, (where $x_t$ denotes an object that is allocated at site X by the $t^{th}$ global allocation request in the program):

$$\min(T_{alloc}(H)) \leq t \leq \max(T_{alloc}(H)) \Rightarrow X \notin S_{alloc}(H)$$

where:
(i) $H=\{x_{i1}^{j1}, \ldots, x_{ik}^{jk}\}$ is a set of k unique objects;
(ii) $x_{im}^{jm}$ denotes an object allocated at allocation site $X^{jm}$ by the $i_m^{th}$ allocation request of the program;
(iii) $S_{alloc}(H)=\{X^{j1}, \ldots, X^{jk}\}$ is the set of allocation sites for objects in H; and
(iv) $T_{alloc}(H)=\{i1, \ldots, ik\}$ is the set of allocation request times for the objects in H.

If objects in H are coallocatable, then they can be placed contiguously in memory if:
(i) allocation sites in $S_{alloc}(H)$ allocate in a designated memory arena M;
(ii) memory arena M allocates consecutive allocation requests contiguously; and
(iii) intervening objects allocated at sites not in $S_{alloc}(H)$ are allocated in a different memory arena.

Returning to FIG. 3A, the term "coallocation set" denotes the set of allocation sites of coallocatable objects. In other words, a coallocation set includes the allocation sites for a particular group of data objects to be coallocated in an arena. For example, $\{A, B, C\}$ is the coallocation set for coallocatable objects $a_3$, $b_5$, and $c_{10}$. Enforcing this coallocation set saves two cache misses for every occurrence of the hot data stream $a_3$ $b_5$ $c_{10}$ according to the model presented in the preceding sub-section.

Overall system performance improves by the formula weighted miss reduction w'=h×m×r. For example, if the hot data stream $a_3$ $b_5$ $c_{10}$ covers 60% of the reduced trace and coallocating the objects in the stream achieves a miss reduction of 2 per occurrence, w' shows that the effect of coallocating includes an overall weighted miss reduction of 1.2.

D. Basic Object Coallocation Algorithm

Figure 4:
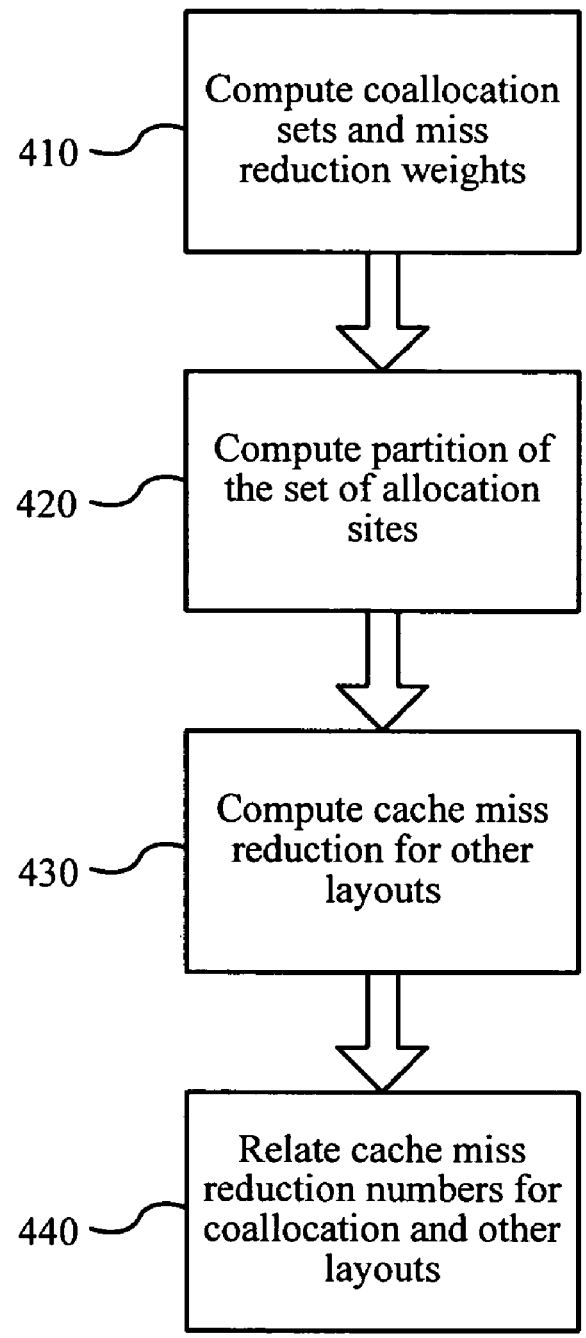
FIG. 4 is a flowchart showing a technique for finding a solution for coallocating hot data streams.

FIG. 4 shows a technique 400 for finding a solution for coallocating hot data streams, with the goal of finding a coallocation strategy that maximizes cache miss reduction. An analysis tool performs the technique. FIG. 5A shows a corresponding pseudocode listing for an algorithm for coallocating hot data streams in some embodiments. In alternative embodiments, an analysis tool uses a different technique for finding a solution for coallocating hot data streams. For example, the tool uses additional and/or different criteria for identifying the allocation context (e.g., with call stack signatures) or measuring coallocation benefits.

With reference to FIG. 4, in a first phase 410, for every hot data stream, the analysis tool computes coallocation sets along with the number of cache misses avoided if the coallocation set is enforced. FIG. 5B shows a pseudocode listing for the first phase of the pseudocode of FIG. 5A. The analysis tool performs involves an exponential exploration of the possible coallocations. This is tractable since hot data streams are usually small (and recall that, with typical settings, the analysis detects minimal hot data stream with length at least 2 and not exceeding 20). In FIG. 3A, the objects $a_3$ and $b_5$ are coallocatable; this coallocation will eliminate one cache miss, and the weighted miss reduction for $S_{alloc}((a_3,b_5)=\{A, B\}$ is 0.6. If several objects from the same site are included in a stream, care should be taken not to double count cache miss reductions. For example, the groups of coallocatable objects (i) $e_6$, $a_{12}$, (ii) $e_6$, $a_{14}$ and (iii) $e_6$, $a_{12}$, $a_{14}$ are all coallocatable and come from the same coallocation set $\{A, E\}$. To avoid double counting, the technique uses a polynomial algorithm to find the maximal partition of coallocatable objects that come from a coallocation set. Thus, in FIG. 3A, a weighted miss reduction for coallocation set $\{A,E\}$ only accounts for coallocating the objects $e_6$, $a_{12}$, $a_{14}$. Finally, the tool accumulates the potential miss reduction per coallocation set and then normalizes it with respect to total expected cache misses in the model, as shown in FIG. 3B. Alternatively, the tool uses additional and/or different criteria to compute or evaluate coallocation sets.

Returning to FIGS. 4 and 5A, in order to maximize the benefits of coallocation sets, in a second phase 520, the tool computes a partition of the set of allocation sites, such that cache miss reduction is increased. The partition problem is an instance of a known NP-hard problem—weighted set packing ("WSP"). (See P. Crescenzi and V. Kann, "A Compendium of NP Optimization Problems.") WSP is defined as follows: Given a set S of m base elements and a collection $C=\{C_1, C_2, \ldots, C_n\}$ of weighted subsets of S with a weight function w, find a subcollection $C' \subseteq C$ of disjoint sets of maximum total $\Sigma_{C_i' \in C'} w(C_i')$.

In this case, S is the set of hot allocation sites (i.e., the set of sites allocating at least one object that participates in a hot data stream). C is the set of coallocation sets, and $w(C_i)$ is the normalized potential cache miss reduction. In the view of some, the best approximation algorithm for the WSP problem is that of Halldórsson. This algorithm approximates WSP to within $2\sqrt{m}$ of the optimal solution in time proportional to the time it takes to sort the weights. Although the approximation algorithm may yield poor results for large values of m, this is not a significant problem for most benchmarks. This is because: (i) the number of hot allocation sites m is small, and (ii) the Halldórsson algorithm is a greedy-like algorithm. In most cases, much of the cache miss reduction benefit comes from a few disjoint coallocation sets. Thus, even for a large m, these coallocation sets will be selected by the approximation algorithm, yielding most of the potential benefits. The result of the second phase of the coallocation algorithm is an approximate coallocation solution (a WSP solution) and a number $R_o$ reflecting cache miss reduction over a worst-case scenario. Alternatively, the tool uses additional and/or different criteria to partition the set of allocation sites.

FIG. 3C presents possible partitions of allocation sites, in terms of weighted set packings. For the partition/set packing $\{A, B, C\}$ and $\{D, E\}$, there is a 76% cache miss reduction over the worst-case scenario. Applying Halldórsson's WSP algorithm indeed yields this partition.

FIG. 3D presents the layout of objects using the $\{A, B, C\}$, $\{D, E\}$ partition. The objects of the hot data stream $a_3$ $b_5$ $c_{10}$ are allocated contiguously. The objects $d_4$ and $e_6$, which participate in two hot data streams, are also colocated. This layout also allocated $a_{12}$ and $a_{14}$ for "free"—this coallocation could be attributed to $\{A, B, C\}$ as well.

In a third phase 430, the tool computes the potential cache miss reduction for other layouts (e.g., the "original layout" and "allocation order layout," discussed previously). And, in the fourth phase 440, the tool relates these to $R_o$. The resulting number ($R_o^1$) reflects the expected cache miss reduction over a given layout. Since in this example, $R_1$ for both layouts (i.e., the original layout and allocation order layout) is 0, the benefits for coallocating {A, B, C}, {D, E} are 76% over both layouts. Alternatively, the tool uses additional and/or different evaluation criteria, for example, using more, fewer, or even no comparisons.

IV. Coallocating Object Fields

Figure 6:
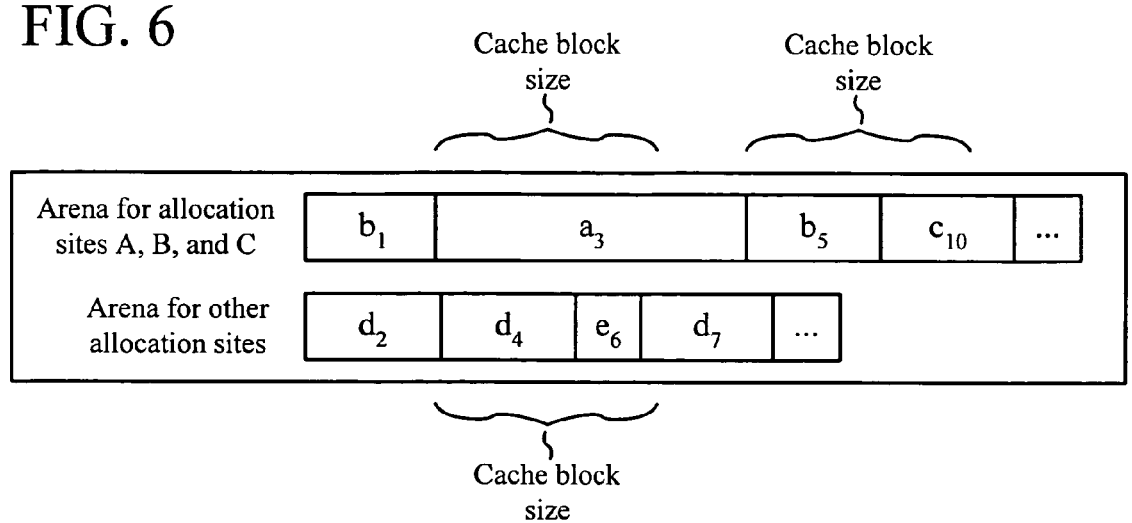
FIG. 6 is a block diagram of a memory layout showing objects too large for effective cache-conscious coallocation at the object level of granularity.

To get the most benefit from object coallocation, the coallocated objects are smaller than a cache block. Unfortunately, empirical results show that data objects are often larger than a typical cache block, or are too large for multiple objects to fit in a single cache block. For example, FIG. 6 shows another version of the memory layout of FIG. 3D, in which the data objects have different sizes. Certain objects (for example, the object $a_3$) may be larger than a cache block. Or, two objects (for example, the objects $b_1$ and $a_3$) may be too large to be put in a cache block together. A typical cache block is 32 bytes, though processors such as the P4 and Itanium have 128 byte L2 cache blocks.

Even if coallocated objects are larger than a cache block, however, coallocation at an object field granularity can produce benefits in cache performance. Changing the abstraction level of the data reference trace—so references are abstracted to objectfield accesses rather than object accesses—permits applying the object coallocation techniques described previously to achieve field coallocation. The resulting field coallocation solution is simple to enforce when fields of an object are independently allocated. Layouts with independently allocated fields can be enforced with compiler support in strongly typed languages such as Java or C#. On the other hand, for other languages, implementing and enforcing independent field allocation can require rewriting or redesign of the computer program. The implementation effort and cost for enforcement in languages such as C can be very high.

Unfortunately, much legacy code (including performance critical code) is written in C and similar languages, and much code continues to be written in such languages. To address this, field coallocation solutions are explored in terms of common data restructuring techniques such as field reordering, object splitting, and object merging. Such restructuring techniques yield a spectrum of coallocation solutions, which tradeoff ease of layout enforcement with larger cache miss rate reduction. The layouts that yield the largest cache miss rate reductions typically involve the most restructuring and enforcement, and vice versa. Promisingly, empirical results show that for many benchmarks, most of the benefits arise from any of several different combinations of these standard restructuring techniques.

A. Field Coallocation Example

For object field coallocation, to start, a simplifying assumption is made that an allocation request for an object with n fields is split into n field allocation requests coming from n different allocation sites (one request and site for each field). Additionally, an assumption is made that independent allocation of fields and fields of an object may be scattered in the heap.

Figure 7A:
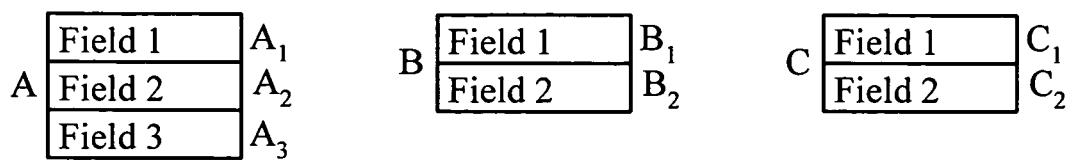
FIG. 7A is a block diagram showing objects and fields for allocation sites.

FIG. 7A shows an allocation site A allocating a 3-field object, and allocation sites B and C allocating 2-field objects, respectively. $A_1$, $A_2$, and $A_3$ are corresponding field allocation sites, for independent allocation of the fields of A.

Figure 7B:
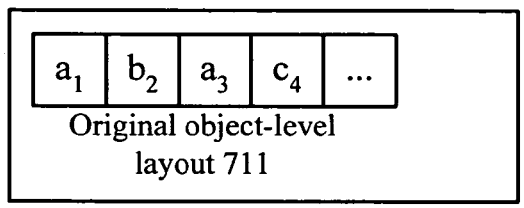
FIG. 7B is a block diagram of a layout at the object level without cache-conscious coallocation.

FIG. 7B shows a memory layout 711 for 4 objects ($a_1$, $b_2$, $a_3$, and $c_4$) allocated at the object-level allocation sites A, B, and C. The objects are laid out in the order by which they were allocated.

Figure 7C:
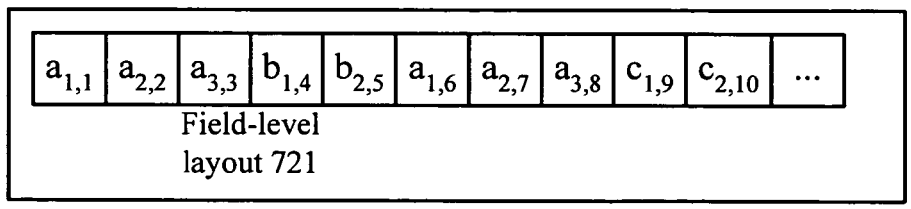
FIG. 7C is a block diagram of a layout at the object field level without cache-conscious coallocation.

In FIG. 7C, the layout 721 is expressed at a field granularity, where $a_{i,j}$ denotes the $j^{th}$ field global allocation request in the program, which is allocated at field allocation site $A_i$ (the $i^{th}$ field of an object allocated at A). For example, the data object $a_3$ is allocated by three consecutive field allocation requests coming from the field allocation sites $A_1$, $A_2$, and $A_3$ allocating fields $a_{1,6}$, $a_{2,7}$, and $a_{3,8}$ respectively.

With this abstraction, the coallocation techniques presented above may be adapted by replacing "objects" with "fields." In general, $R_1^{SAM}$ denotes the potential cache miss reduction over a given layout ("original layout" or "allocation order layout" are used), supposing that combinations of field reordering, object splitting, and object merging are permitted in object restructuring.

Independent allocation of fields gives finer control over object layout and may allow the coallocation algorithm to find a larger number of cache-conscious placement opportunities. However, these improvements may come at the cost of maintaining the program semantics with the transformed layout. For example, a compiler typically assumes that fields of an object are placed contiguously (or at least not at arbitrary locations). While it should be possible to enforce such a layout with compiler support for type safe languages such as Java or C#, languages such as C and C++ use an alternative solution.

B. Object Restructuring for Field Coallocation

In some embodiments, techniques are used to coallocate fields while limiting object restructuring to simple mechanisms, such as field reordering, object splitting and object merging. In particular, the techniques use any one or more of four field coallocation solutions categorized as follows, depending on the restriction of the object restructuring mechanisms used:

(i) only field reordering is used ("field reorder coallocation"),
(ii) object splitting is used, either with or without field reordering ("object split coallocation"),
(iii) merging of objects is used, either with or without field reordering ("object merge coallocation"), and
(iv) an object can either be split or it can be merged with other objects, but it cannot participate in both operations ("split or merge coallocation").

Figure 7D:
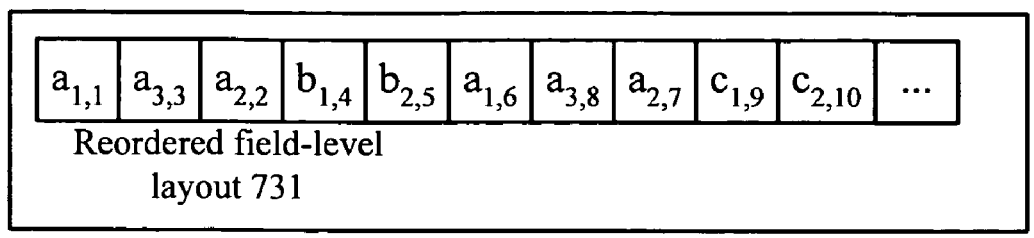
FIG. 7D is a block diagram of a layout at the object field level after field reordering.

In these embodiments, while the coallocation techniques consider coallocation opportunities at the field granularity, solutions are enforceable at the object allocation site level. This eliminates the need to transform an object allocation into multiple field allocations, but may require object restructuring to split an object or merge objects for allocation of the appropriate data. Implementing the resulting coallocation solutions is thus much simpler in many cases, at the cost of some lost opportunities for field coallocation. The following restricted coallocation criteria are considered:

(i) Fields in a hot data stream are "field reordering coallocatable" if field reordering suffices to guarantee coallocation of the fields. For example, in FIG. 7C, the fields $a_{1,1}$ and $a_{3,3}$ are field reordering coallocatable, since reordering the fields of A (i.e., by placing the first and the third field together) ensures coallocation. FIG. 7D demonstrates the layout 731 after this field reordering.

(ii) Fields in a hot data stream are "object split coallocatable" if object splitting (either with or without field reordering) suffices to ensure coallocation of these fields.

Figure 7E:
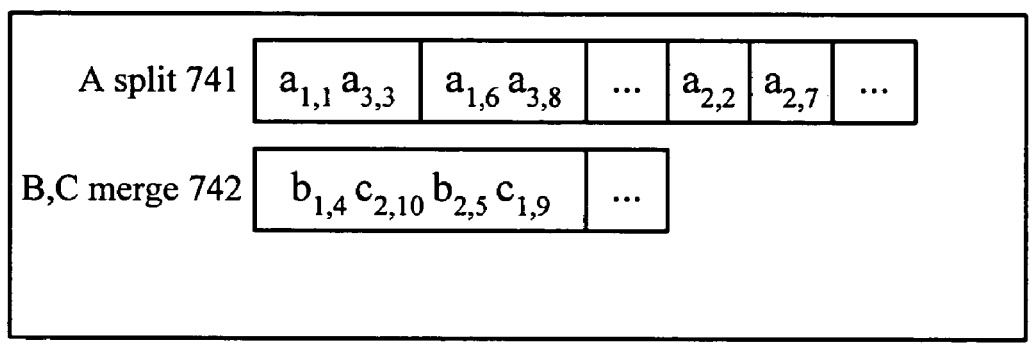
FIG. 7E is a block diagram of a layout at the object field level after object splitting and merging, with field reordering.

For example, in FIG. 7C, the fields $a_{3,3}$ and $a_{1,6}$ are object split coallocatable, since splitting the fields of A, while placing the first and the third fields of instances of A contiguously, ensures coallocation (without intervening instances of objects for the second field of A). Practical implementations of object splitting are described below. FIG. 7E demonstrates a layout 741 after splitting the fields of A.

(iii) Fields in a hot data stream are "object merge coallocatable" if merging the types of the respective object allocation sites (either with or without field reordering) ensures coallocation of these fields. For example, in FIG. 7C, the fields $b_{1,4}$ and $c_{2,10}$ are object merge coallocatable, since merging the types allocated at B and C (and reordering the fields of the combined type to place the first field of B together with the second field of C) ensures coallocation. Practical implementations of object merging are described below. FIG. 7E demonstrates a layout 742 resulting after merging B and C and reordering the fields to place together the first field of B and the second field of C.

Figure 8:
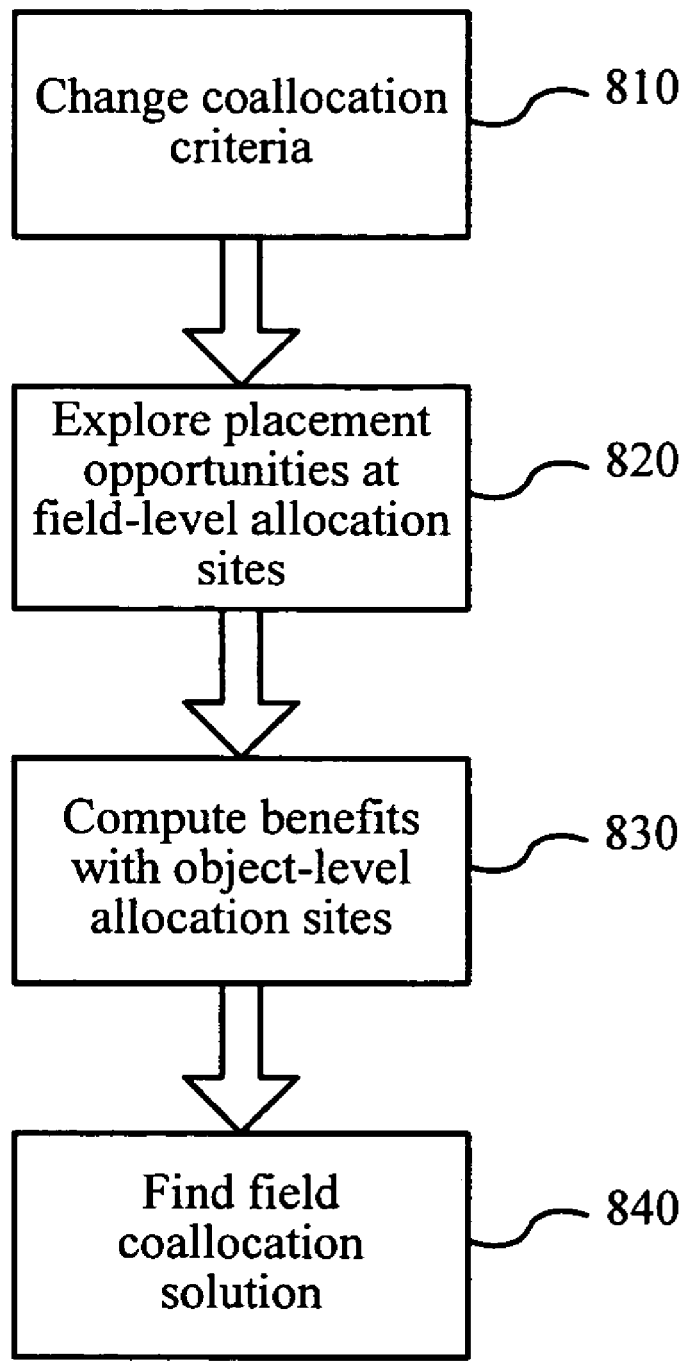
FIG. 8 shows a generalized technique for finding a solution for field coallocation.

FIG. 8 shows a generalized technique 800 for finding a solution for field coallocation. A tool such as the analysis tool cmanal performs the technique 800. Alternatively, another tool performs the technique. FIGS. 9A and 9B shows a corresponding pseudocode listing for an algorithm for field coallocation in some embodiments.

With reference to FIG. 8, the tool first changes 810 the coallocation criteria for the first phase of the basic algorithm. (As noted in FIG. 5A, the parameter coallocatable can reflect different coallocation criteria.) For example, instead of checking that objects in a hot data stream H are coallocatable, the tools check that objects in H are field reorder coallocatable, object split coallocatable, and/or object merge coallocatable. In the pseudocode shown in FIG. 9A, all three options are evaluated in the "first phase" shown in FIG. 9A. Alternatively, the tool uses additional and/or different coallocation criteria.

Next, the tool explores 820 simple placement opportunities at the level of field allocation sites. The tool then computes 830 the benefits of different placement techniques when allocation sites are at object level. For example, the tool uses WSP approximation to compute the benefit of using a particular simple placement technique at the object allocation site level. In the pseudocode shown in FIG. 5A, this occurs in the "second phase" shown in FIG. 5A. Alternatively, the tool uses additional and/or different strategies or measures for evaluating placement opportunities.

In these embodiments, splitting and reordering are not applicable to more than one allocation site at a time. In other words, the tool does not combine several allocation sites and then split them. Object merging is applicable for two or more allocation sites that have not been split. However, the tool considers the benefits of simple reordering in the merge coallocation solution.

Figures 10C, 10D, 10E:
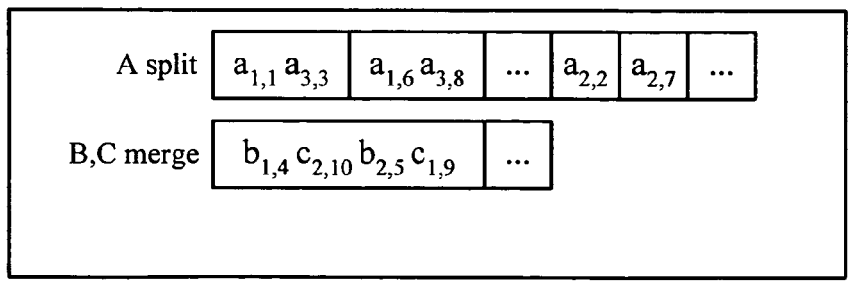
FIG. 10C is a chart showing the results of applying WSP for fields, when object-level allocation sites are used.
FIG. 10D is a chart showing WSP field solutions.
FIG. 10E is a block diagram of the layout of object fields in accordance with split or merge coallocation.

Consider the example in FIGS. 10A-10E. FIG. 10A shows analysis of coallocatable object fields and coallocation sets for hot data streams on a field access trace. The two leftmost columns of FIG. 10A show the result of hot data stream analysis on a field access trace. The stream $H_1 = a_{1,1}\ a_{3,3}\ a_{1,6}\ a_{3,8}$ covers 80% of the reduced trace, and the stream $H_2 = a_{2,2}\ b_{1,4}\ c_{2,10}$ covers 20% of the reduced trace. FIGS. 10A and 10B show the results of applying different field coallocatability definitions to the hot data streams, where (R), (S), (M) denote field reorder benefits, object split benefits, and object merge benefits, respectively.

FIG. 10C shows the results of applying WSP for fields, when object-level allocation sites are used. For field reordering (R), only A has reordering benefits (by placing its first and third fields together). For object splitting (S), again only A has benefits (by splitting objects coming from A so the first and third fields of these objects are placed contiguously— FIG. 10E shows A's split layout). Finally, for object merging (M), several opportunities exist. Merging either (i) A and B, (ii) A and C, or (iii) B and C gives 0.07 potential benefit. Merging A, B, and C gives 0.14 benefit.

Returning to FIG. 8, after computing 830 the benefits of different placement techniques, the tool finds 840 a field allocation solution. For example, the tool applies the WSP approximation once again for the placement techniques to approximate the optimal disjoint subsets of object allocation sites that are candidates for layout changes. (For object splitting and field reordering coallocation solutions, WSP is actually the identity function since all the coallocation sets are of size 1, thus they are pairwise disjoint.) In the pseudocode listing of FIG. 9B, $R_1^r$, $R_1^s$, and $R_1^m$ denote the reduction of cache misses over a given layout for field reorder coallocation, object split coallocation and object merge coallocation, respectively. Alternatively, the tool uses additional and/or different strategies or criteria for finding a field coallocation solution.

FIG. 10D shows the WSP field solutions for field reordering coallocation, object splitting coallocation, and object merging coallocation. By simply reordering the fields of A (placing the first and third field as shown in FIG. 10C), a potential cache miss reduction of 0.57 is achieved. The WSP solution for object splitting (S) shows that splitting the objects at allocation site A (placing the first and third field together as shown in FIG. 10C) results in a potential cache miss reduction of 0.86. The WSP solution for object merging (M) for merging A, B, and C results in a potential cache miss reduction of 0.14.

FIG. 10D also shows a hybrid solution—split or merge— where an object at an allocation site may be either split or participate in a merge with object(s) from other object allocation sites. The fields of these objects may also just be reordered. Thus, for every object coallocation set, the tool may compute the maximal benefit obtained by split and reorder or by merging (collectively denoted by $w_{svm}$). Applying WSP to object coallocation sets with $w_{svm}$ (for example, as shown in FIG. 9B, third phase) gives the coallocation solution for the "split or merge" option. FIG. 10D shows the benefit of the WSP solution for the $s_{svm}m$ option. Splitting A yields 0.86 potential cache miss reduction, and merging B and C gives 0.07 more potential reduction, for a total potential miss reduction of 0.93.

FIG. 10E shows the layout obtained by applying the split or merge coallocation solution. The area between $a_{1,6}\ a_{3,8}$ and $a_{2,2}$ is reserved for placing the first/third field objects of further allocations requests from that split of site A. The next section provides details on how this is implemented.

Returning to FIG. 9B, $R_{1\,svm}$ denotes the expected cache miss reduction of split or merge over a given other layout (e.g., either "original layout" or "allocation order layout"). It is expected that both $R_1^r \leq R_1^s \leq R_{1\,svm} \leq R_1^{svm}$ and $R_1^r \leq R_1^m \leq R_{1\,svm} \leq R_1^{svm}$.

In alternative embodiments, an analysis tool uses a different technique for finding a solution for field-level coallocation, using additional and/or different criteria for identifying the allocation context, identifying coallocation opportunities, or measuring coallocation benefits. In a programming language such as Java or C#, for example, it may be easier to split fields of an object for separate allocations. Similar operations are done for garbage collection and other runtime software. A compiler might implement such splitting at compile time. Or, common language runtime software might implement such splitting at runtime, for example, controlling field level allocation at the policy level, or making other decisions about field reordering, object splitting, and/or object merging.

V. Implementing Coallocation

A. Coallocation Tool

Figure 11:
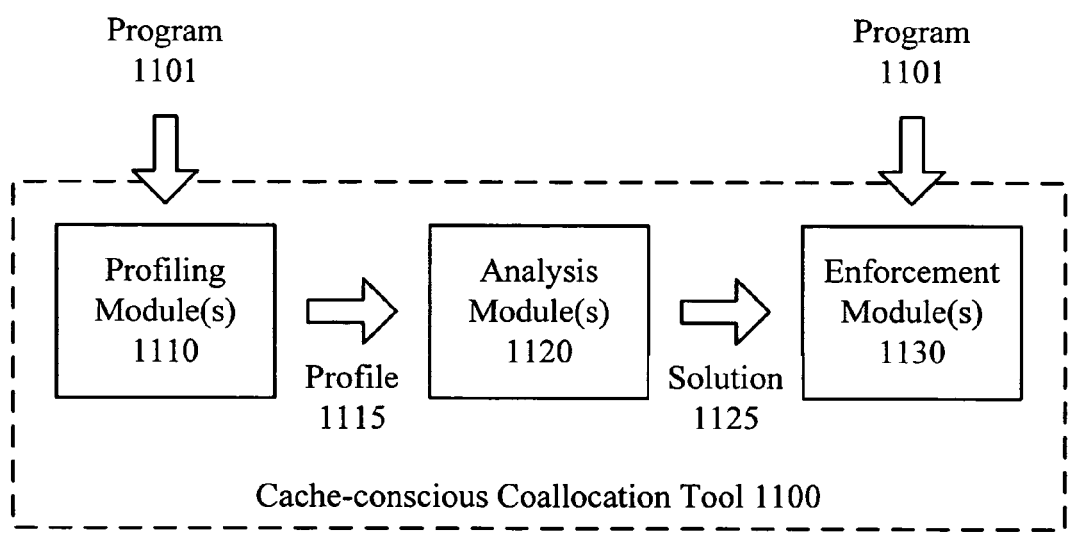
FIG. 11 is a block diagram of a coallocation tool.

FIG. 11 shows a generalized tool 1100 for cache-conscious coallocation. The tool 1100 includes modules for profiling and analysis, as well as modules for enforcement of a coallocation solution. While FIG. 11 shows a particular configuration of modules, modules of the tool 1100 can be split, merged, replaced with similar modules, or otherwise modified while still performing cache-conscious coallocation. For example, in one implementation, the profiling and analysis module cmanal produces a coallocation solution that is enforced by the instrumentation module cminstr and a coallocation library comalloc.

The tool 1100 includes one or more profiling modules 1110 for profiling a computer program 1101. The profiling modules produce a profile 1115 such as a data reference trace that shows temporal access pattern behavior at object, field, or other level. The reference abstraction granularity (object, field, or other) is determined when the trace is produced or at some other time. For example, the tool cmanal uses Sequitur to compress a reference trace, which is obtained with low-overhead using the technique described in the article Hirzel et al., "Bursty Tracing: A Framework for Low-overhead Temporal Profiling," $4^{th}$ Workshop on Feedback-Directed and Dynamic Optimization, pages 117-126, December 2001. This produces a context-free grammar representation for the profile 1115. Alternatively, the tool 1100 uses other and/or additional modules for profiling.

The tool 1100 includes one or more analysis modules 1120 for analyzing the profile 1115 and determining one or more cache-conscious coallocation solutions 1125. The analysis module(s) 1120 receive a profile 1115 such as a data reference trace for subsequent analysis. For example, the tool cmanal efficiently analyzes a context-free grammar representation for a profile to find hot data streams with their associated normalized heat value. The tool cmanal applies a coallocation algorithm (as described in the previous sections) to produce a collection of coallocation sets. The allocation context abstraction level (i.e., just the allocation site, or a calling context of some length l) is a tunable parameter, but may also be pre-defined. Alternatively, the analysis module(s) include other and/or additional modules.

Finally, the tool 1100 includes one or more enforcement modules 1130 for enforcing the cache-conscious coallocation solution(s) 1125 during execution of the program 1101. The enforcement module(s) 1130 include modules for changing the behavior of the program 1101 at development time, compile time, after compile time but before run time, or at run time. At development time, for example, the enforcement module(s) 1130 may include modules for presenting the solution(s) 1125 to a programmer and assisting the programmer in implementing the solution(s) 1125. At compile time, the enforcement module(s) 1130 may include modules for modifying the executable code (output from the compiler) for the program 1101 in view of the solution(s) 1125. After compile time but before run time, the enforcement module(s) 1130 may include modules for altering the executable code for the program 1101, for example, by binary rewriting. At run time, the enforcement module(s) 1130 may include modules for enforcing the solution at run time by modifying the program 1101 or enforcing the behavior of the program 1101 as previously modified for the solution(s) 1125.

For example, cminstr is a binary instrumentation tool based on Microsoft's Vulcan binary editing tool (similar to ATOM; see Srivastava et al., "ATOM: A System for Building Customized Program Analysis Tools," SIGPLAN Conf. on Prog. Lang. Design and Impl., 1994). The tool cminstr enforces a coallocation solution produced by the tool cmanal by replacing a program's original heap allocation calls (e.g., malloc calls) with calls to routines of the coallocation library comalloc. The comalloc calls are implemented by an independent dynamic link library that handles coallocation of objects or fields. The instrumented program, running in conjunction with the comalloc library, then uses memory according to the coallocation solution layout.

Alternatively, the enforcement module(s) include other and or additional modules. For example, the enforcement module(s) inject code into a program for enforcing coallocation in some other manner.

B. Run-Time Support

In some embodiments, a coallocation tool enforces a coallocation solution by reserving a separate memory arena $M_i$ for each coallocation set $C_i$. For consecutive allocation requests from sites in the same coallocation set $C_i$, the tool assigns consecutive addresses in $M_i$. Allocation sites not in any coallocation set are assigned to a default heap arena $M_0$. In one implementation, the tool uses the heap layers infrastructure to implement this memory management policy. (See Berger et al., "Composing High-performance Memory Allocators," SIGPLAN Conf. on Prog. Lang. Design and Impl., June 2001.) Heap layers permit managing several separate heaps, where each heap is independently managed, possibly with a different policy. Alternatively, a tool uses other software to enforce a coallocation solution.

With the comalloc library, each heap $M_i$ is managed with comalloc functions (i.e, functions of the form comalloc$_i$) allocating memory from the respective heap. There is also support in the comalloc library for realloc and calloc functions through corealloc$_i$, and cocalloc$_i$, respectively. Heap layers provide a way to set the characteristics and memory management of a heap, simply by changing its type defined by a mixin of templates providing different layers of heap functionality. Thus, after enforcing a coallocation solution, each heap $M_i$ can be tuned independently.

"Free" operations are implemented by recording the owner heap of every object in its header. Every heap includes a "ownerHeap" layer as part of its type. When calling a "free" function, an actual free$_i$ is dispatched to the owner heap of the object being freed. This additional owner header information may reduce some of the coallocation benefit. As an alternative, maintaining ownership information separately from the object likely produces larger coallocation benefits, since objects accesses are typically much more frequent than free operations.

C. Support for Object Splitting and Merging

Instance interleaving is one way to split an object. Instance interleaving splits object instances, such that frequently accessed instance fields are laid out contiguously in memory. (See Truong et al., "Improving Cache Behavior of Dynamically Allocated Data Structures," IEEE Parallel Arch. And Compiler Techniques, October 1998.) In one implementation, this is done by adding special padding fields to the object type definition and allocating the objects using an instance interleaving library ialloc, which maintains the invariant of placing frequently accessed fields of object instances contiguously. The ialloc library may be adapted to work with the heap layers infrastructure, in which case a iallocHeap layer is used to enforce splitting an object. Alternatively, a tool uses other software to implement and/or enforce object splitting.

One way to do object merging is to combine the object type definitions (i.e., so that the combined type contains all the fields of the types being merged) and use a new heap layer mergeHeap for allocations. For example, suppose the allocation sites A, B, . . . , K are merged. Upon allocation requests from any of these sites, mergeHeap determines if a new object (large enough to store the combined object type) should be allocated, or if the last allocated combined object can be re-used to satisfy the allocation request. Consider an example where A and B are merged allocation sites, and allocation requests come from A, then B and then again from B. In response to the allocation request from site A, the routine mergeHeap returns a new object $o_1$ large enough to hold the combined type of A, B. The first allocation request from B is returned the address of $o_1$ so that the B portion of $o_1$ can be used. The next allocation request from B causes allocation of a new combined object $o_2$, since the last allocated combined object $o_1$ was already used to satisfy the prior request from site B. Alternatively, a tool uses other software to implement and/or enforce object splitting.

D. Limitations

Depending on implementation, there are several potential limitations on performance of a coallocation tool. These limitations relate to tracking information, cache block size, and programming languages.

In some implementations, object size and owner heap information are kept in an 8 byte object header. This header may reduce some of the potential benefits of coallocation, since the header limits opportunities for cache block coallocation. In other implementations, the 8 byte object header has less of an effect because cache block sizes are larger. In still other implementations, object size and owner heap information are tracked in a separate structure.

In some implementations, a coallocation tool lacks access to type information and support for type manipulations. Thus, for example, field reordering is done by manual source code modification. As another example, the instrumentation tool cminstr relies on receiving the PC's of malloc calls to be replaced by comalloc calls. Type manipulations affect the binary code, however, so allocation site PC's for a field coallocation solution are adjusted. On the other hand, an object coallocation solution, which does not involve type manipulations, is enforced automatically. In addition, splitting array elements is hard to enforce in some languages, since it involves changes in the pointer arithmetic around array expressions. In principle, a compiler can employ such layout, assuming precise type information. An alternative is to enforce array splitting manually (according to the coallocation solution), or to ignore array splitting suggested by the coallocation solution.

Finally, C programs may pose a problem with respect to type manipulation. Sometimes field reordering can crash an application due to hidden assumptions regarding structure layout. This problem is eliminated in strongly-typed languages, such as Java or C#.

VI. Experimental Evaluation

A. Experimental Methodology

In experiments to show the effectiveness of the coallocation techniques and tools described herein, the techniques and tools were evaluated against various benchmarks. These benchmarks include memory-performance-limited programs such as vpr, twolf and mcf from the SPECint2000 suite, boxsim (a graphics application that simulates spheres bouncing in a box), and mst and health (two Olden benchmarks).

The benchmarks were instrumented with Microsoft's Vulcan tool to produce a data reference trace along with heap allocation information. The heap allocation information was used for trace abstraction at an object or field granularity depending on the experiment. The traces were processed by cmanal to produce object/field coallocation solutions, which were enforced using cminstr and the comalloc allocation library. The coallocation solutions were evaluated on different inputs than the one used to generate the solution. Measurements of CPU time and hardware performance counters were carried out on a 900 Mhz Pentium-III with 1 GB of memory running Windows 2000, with a 256 KB L2 data cache and 16 KB L1 data cache, and 32 byte cache blocks. To minimize the effect of different allocator policies on runtime, the same allocator is used for allocating objects in the original benchmark and for allocating objects not in a coallocation set in the optimized benchmark. The results represent an average of three runs.

B. Hot Data Stream Analysis

FIG. 12A shows that, except for mst, hot data streams cover around 90% of the trace for both object and field address abstractions. The number of hot object addresses is small (<10%) in four of the benchmarks, leading to fast coallocation analysis. However, at the granularity of field accesses, traces exhibit less regularity, as around 20% of the field addresses participate in hot data streams. This difference is primarily due to arrays, since an array is abstracted to a single object address, but at a field granularity distinct identities are assigned to fields accesses from distinct array elements. There are other ways to abstract arrays, which are not shown in FIG. 12A. The problem is that coallocating array elements breaks the invariant that consecutive array elements are contiguous, and can require significant source modifications.

C. Object Coallocation Results

FIG. 12B presents allocation site characteristics of the benchmarks and the coallocation solutions. In particular, FIG. 12B shows results for various coallocation solutions in terms of allocation sites. The "sites" column presents the number of program allocation sites. The "hot" column shows the number of sites that allocate objects that participate in hot data streams. The next 6 columns present the number of sites participating in various coallocation solutions, respectively. For object coallocation, the results indicate significant coallocation opportunity. More sophisticated coallocation techniques create more coallocation opportunity up to a certain point. For example, field reordering finds far less coallocation opportunities than split or merge. On the other hand, the numbers for split and merge in terms of program allocation sites are quite similar to split or merge numbers, indicating that much of the benefits of the general field coallocation solution (namely, split and merge) can be attained with a more restricted solution (here, split or merge).

Figure 12C:
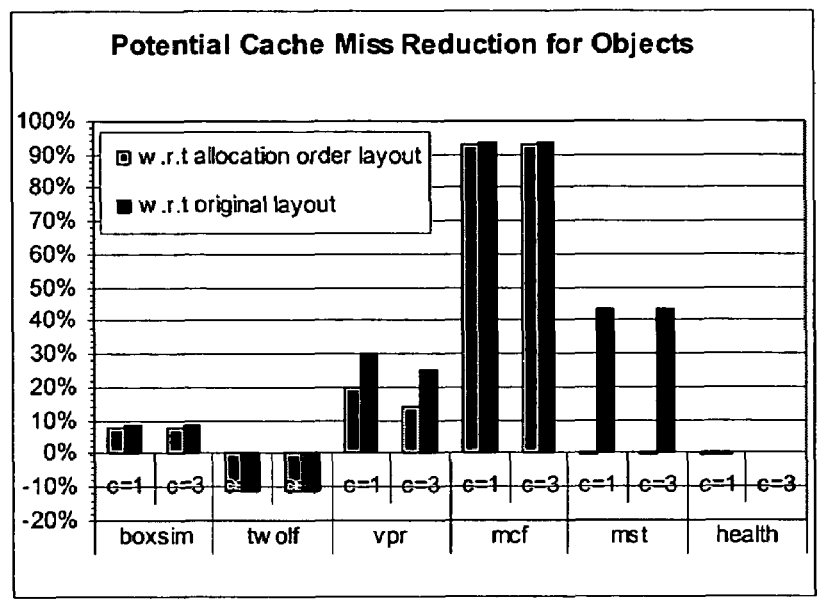

FIG. 12C shows potential cache miss reduction numbers when coallocating at the granularity of object addresses, where the base (i.e., no improvement) is 0%. Several models are evaluated. First, different allocation calling context abstractions are compared. The bars for c=3 indicate abstracting an object address to a calling context of length 3 leading to the allocation of that object. The bars for c=1 indicate abstracting an object address to its allocation site. In addition, FIG. 12C shows potential reduction in cache misses with respect to two alternative layouts, original layout and allocation order layout. For the benchmark health, there is no improvement over original layout, indicating that the objects are already placed in a cache-conscious way. The improvement over the original layout in mst is obtained since large objects and small objects are alternately allocated, and the coallocation solution suggests placing these contiguously. In vpr and mcf, the potential cache miss reduction is attributed mainly (more than 90% of it in mcf) to coallocating large objects (ranging from 120 bytes to several KBytes) that do not fit in a cache block. Having the analysis take the object and cache block size into account would avoid such situations, though larger cache blocks combined with sequential hardware pre-fetching implemented in next-generation processors could take better advantage of such a layout. Not surprisingly, the actual cache miss reduction is negligible for vpr and mcf. In twolf, the numbers are negative. In this case, the WSP coallocation solution yields potential benefits over the worst case scenario, but those benefits are less than the benefits of the original layout over the worst case scenario. This is due to the approximation algorithm used, which is bounded to $2\sqrt{\text{hotallocationsites}}$ of the optimal coallocation solution.

Due to only small differences when comparing different calling contexts, subsequent figures only consider coallocation solutions that use the object allocation site (i.e., the c=1 solution). This solution is enforced with cminstr and comalloc. In addition, due to small differences in potential cache miss reduction over "allocation order layout" and "original layout" (except mst), subsequent figures only consider potential reduction achieved over original layout.

For object coallocation, due to large object sizes relative to the cache block size, there are negligible improvements in cache performance and execution time (around 1% speedup), though next generation machines may see larger benefits.

D. Field Coallocation Results

FIG. 12B also presents allocation sites characteristics of a field coallocation solution. For split and merge, FIG. 12B presents numbers in terms of field allocation sites, since this solution assumes fields are split and merged arbitrarily. In the "split and merge" column, the number in parentheses is the number of hot sites in terms of field allocation sites.

Figure 12D:
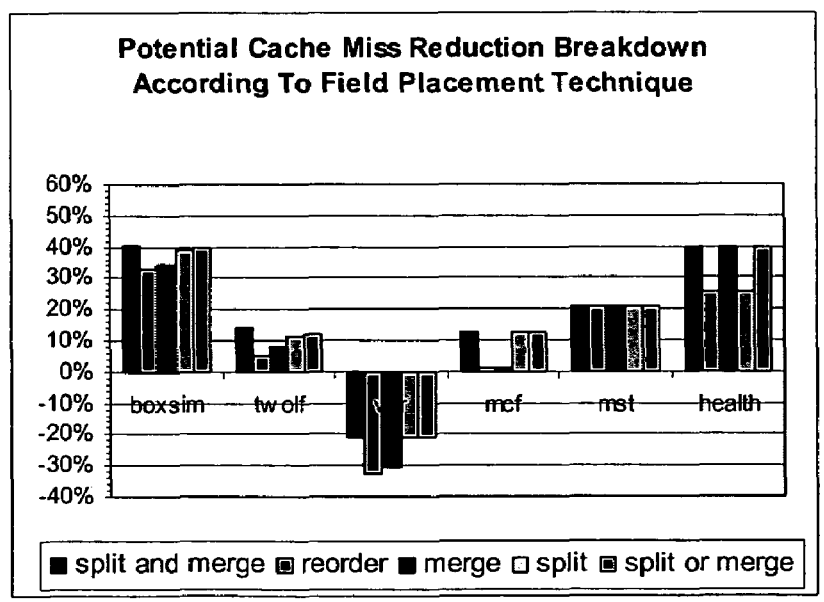

FIG. 12D shows potential cache miss reduction numbers for coallocating fields according to various field placement techniques, compared to the original layout. For each benchmark, FIG. 12D shows results 5 strategies for field coallocation. For boxsim and twolf, split and merge is preferable, although in boxsim, split or merge performs almost as well. Since split and merge requires sophisticated source transformations, however, the split or merge is employed for twolf as well. In mcf, object splitting suffices to obtain most of the benefits. The solution for mst only requires reordering of fields. In health, object merging suffices to obtain the coallocation benefits. In vpr, the numbers are negative (again due to the approximation algorithm) and coallocation is avoided since the benefits under the coallocation solution are less than the benefits of the original layout achieved by the current heap allocator.

In some implementations, coallocation tools lack type information. As a result, some type manipulation suggested by the coallocation solutions may not be feasible or may be hard to employ. Other problems arise from the fact that type changes are not always feasible in a non-typesafe environment (i.e., C programs). The following problems may be encountered: (i) If it is assumed that fields are up to 4-bytes long, reordering part of an 8-byte field is not feasible. This can happen for fields of type double, for example, and is the case for boxsim and twolf. (ii) Several allocation sites may be associated with the same type. Thus, a coallocation algorithm that assumes that distinct allocation sites allocate distinct types may suggest conflicting type changes. In boxsim and twolf, two allocation sites allocating the same type are candidates for a merge in a coallocation solution. (iii) Splitting array elements is hard to employ, since it involves changes in the pointer arithmetic around array expressions. Array splitting is suggested in the coallocation solution for twolf, boxsim and mcf, but was employed only in mcf due to the large potential benefit. (iv) Finally, in a non-typesafe environment there may be hidden assumptions on the layout of a structure. In boxsim and twolf, simple field reordering caused these benchmarks to crash.

Figure 12E:
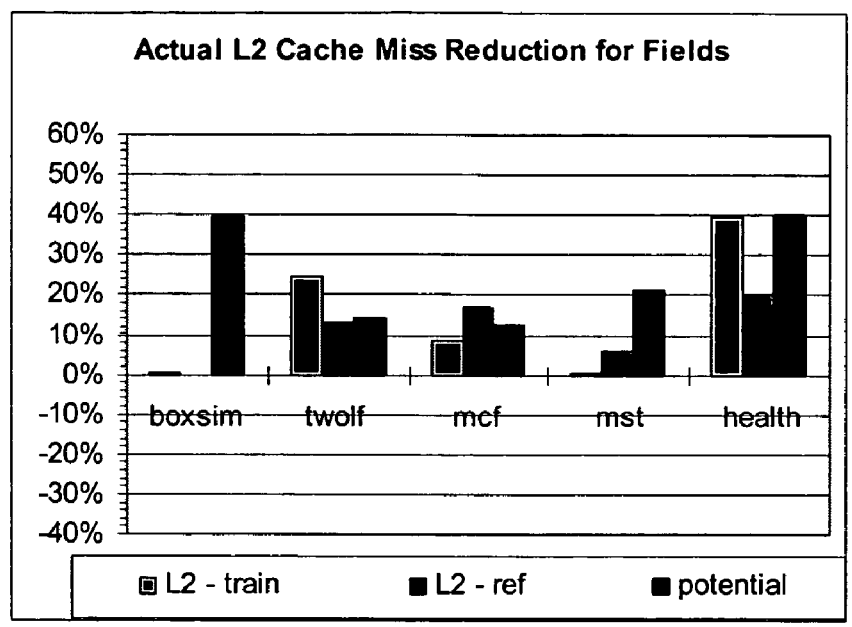

FIG. 12E shows the normalized L2 cache miss reduction for solutions over the original layout, measured using the machine's hardware performance counters. FIG. 12E shows reduction in L2 cache misses for a medium and a large input (shown as train and ref, respectively). The coallocation solutions were obtained using a trace for a small input (test input).

In boxsim, a major part of the field coallocation solution was not enforceable (due to type manipulation problems). Thus, there is minimal improvement in L2 cache miss rate and only around 7% of the potential benefit were obtained. The benefits for mcf come from splitting a hot array. In twolf, layout changes include mostly splitting small objects (12-88 bytes). Thus, for twolf and mcf, the potential and the actual numbers are quite similar. For mst, the potential improvement was not attained due to the size of objects. The reorder solution for mst suggested reordering very small objects (12 bytes long) that already fit in the same cache block. For health, two allocation sites allocating small objects (12 and 16 bytes) were merged.

Figure 12F:
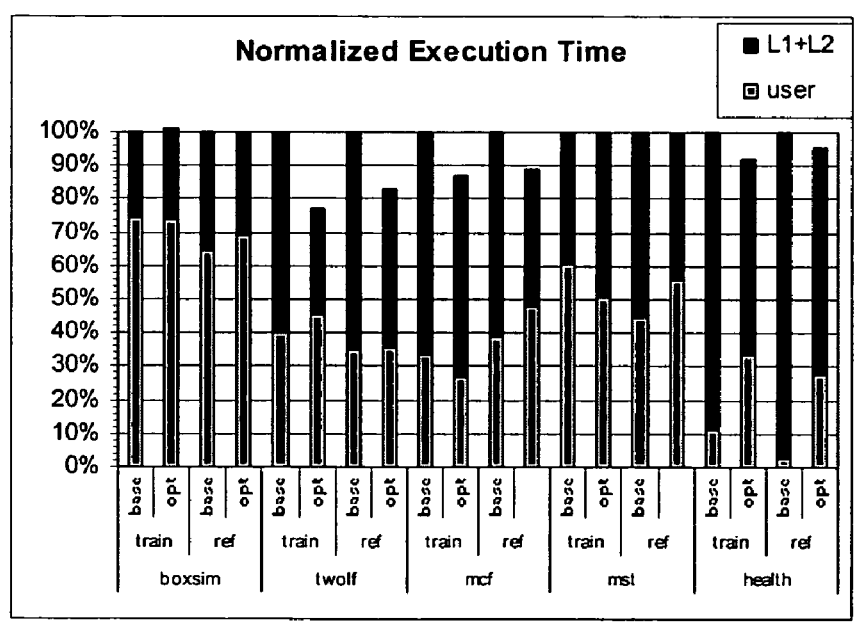

FIG. 12F shows normalized execution time for the benchmarks. Also, the time spent on L1+L2 data cache misses is shown. In boxsim, there is no speedup due to problems of employing the layout. In twolf, there is around 20% speedup, and the time spent in cache misses is reduced by around 27%. For mcf, there is around 12% speedup, and the time spent in cache misses is reduced by around 20%. For mst, there is no speedup. For health, there is around 6% speedup and the time spent in cache misses is reduced by around 30%.

E. Discussion

While object coallocation currently provides little or no benefits in many cases, this should change with larger cache block sizes and/or by combining this technique with a simple sequential pre-fetching scheme. In addition, cache miss rate reductions have implications for energy savings even when they do not produce execution time improvements. Substantial benefits are expected from implementing field coallocation in the context of a type-safe language, as a complement to garbage-collection (GC) based techniques, which move contemporaneously accessed objects together, because that movement occurs only after objects have lived for a while. Field coallocation technique can help bridge the performance gap until GC-based movement techniques take over.

VII. CONCLUSION

Novel profile-based analysis and enforcement techniques aimed at coallocating contemporaneously accessed hot heap objects were presented in various embodiments. In some embodiments, the analysis techniques obtain cache-conscious coallocation of a hot data stream H by isolating and directing allocation sites of H to a sequentially allocated heap arena such that intervening allocations coming from other sites are separated. In other embodiments, extended analysis techniques aim for coallocation at object field granularity, generalizing common restructuring techniques, such as field reordering, object splitting, and object merging. Initial results indicate that programs possess significant coallocation opportunities and that field coallocation reduces L2 cache misses by up to 40%, producing execution time improvements of up to 22%.

Having described and illustrated the principles of our invention with reference to various embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa. The methods and systems illustrated herein describe the functionality of several system components such as a profile-analysis tool, instrunentation tool, and coallocation libraries. It should be understood that the functionality ascribed to any one these and other components described above can also be performed by any of the other related components if they are programmed to do so.

In view of the many possible embodiments to which the principles of our invention may be applied, we claim as our invention all such embodiments as may come within the scope and spirit of the following claims and equivalents thereto.

We claim:

1. A computer-implemented method of enhancing cache performance, the method comprising:
   receiving a temporal data reference profile for a computer program;
   detecting one or more hot data streams in the temporal data reference profile;
   analyzing the one or more hot data streams and the temporal data reference profile to determine a coallocation solution for allocations in heap memory, the coallocation solution comprising direction to allocate particular heap objects to particular heap memory arenas; and
   enforcing the coallocation solution during subsequent execution of the computer program by coallocating sets of heap objects in heap memory arenas according to the direction of the coallocation solution in order to improve locality for accesses of the heap objects.

2. The method of claim 1 wherein the temporal data reference profile traces accesses of objects, and wherein the one or more hot data streams are for object accesses.

3. The method of claim 1 wherein the temporal data reference profile traces accesses of object fields, and wherein the one or more hot data streams are for object field accesses.

4. The method of claim 1 wherein the coallocation solution includes one or more of field reordering, object splitting, and object merging.

5. The method of claim 1, wherein enforcing the coallocation solution comprises:
   altering a computer program to implement the coallocation solution.

6. The method of claim 5 wherein the altering comprises binary rewriting of a computer program.

7. The method of claim 5 wherein the altering comprises rewriting of part of source code of the computer program under control of a programmer.

8. The method of claim 5 wherein the altering comprises adjusting executable code for the computer program at compile time.

9. The method of claim 5, wherein enforcing the coallocation solution comprises:
   after the altering, executing the computer program, wherein run time support software enforces the coallocation solution.

10. A computer-readable medium storing the computer program altered according to the method of claim 5.

11. The method of claim 1 wherein the coallocation solution is based at least in part on results of weighted set packing analysis for plural coallocation sets.

12. The method of claim 11 wherein each of the plural coallocation sets comprises a set of allocation sites for objects in one of the hot data steams.

13. The method of claim 11 wherein each of the plural coallocation sets comprises a set of allocation sites for object fields in one of the hot data streams.

14. The method of claim 1 wherein the analyzing comprises:
   computing a heat value for each of the one or more hot data steams; and
   computing a weight value for each of the one or more hot data steams.

15. The method of claim 14 wherein the analyzing further comprises:
   avoiding double counting for sub-sets among the one or more hot data streams.

16. A computer-readable medium storing computer-executable instructions for causing a computer system programmed thereby to perform the method of claim 1.

17. A computer-readable storage medium storing computer-executable instructions for causing a computer system programmed thereby to perform a method of enhancing cache performance, the method comprising:
   receiving a profile of object field accesses for a computer program;
   determining a coallocation solution based at least in part upon the profile, wherein the coallocation solution comprises one or more directions to allocate particular heap objects to particular heap memory arenas to increases locality of object fields in a layout in memory to improve cache performance; and
   enforcing the coallocation solution during subsequent execution of the computer program by coallocating sets of heap objects in heap memory arenas according to the one or more directions of the coallocation solution in order to improve locality for accesses of the heap objects.

18. The computer-readable medium of claim 17 wherein the profile is a temporal data reference profile that traces the object field accesses.

19. The computer-readable medium of claim 17 wherein the method further comprises:
   detecting one or more hot data streams in the profile.

20. The computer-readable medium of claim 17 wherein the coallocation solution includes object restructuring in a computer program, and the wherein enforcing the coallocation solution comprises:
   executing the computer program after the object restructuring, wherein the coallocation solution guides object-level allocations in heap memory.

21. The computer-readable medium of claim 20 wherein the object restructuring includes field reordering.

22. The computer-readable medium of claim 20 wherein the object restructuring includes object splitting.

23. The computer-readable medium of claim 20 wherein the abject restructuring includes object merging.

24. The computer-readable medium of claim 17 wherein the coallocation solution includes object restructuring in a computer program, the method further comprising:
performing the object restructuring at design time.

25. A computer-readable medium storing the computer program altered according to the method of claim 24.

26. The computer-readable medium of claim 17 wherein the coallocation solution includes object restructuring in a computer program and enforcing the coallocation solution comprises:
perfonning the object restructuring at run time.

27. The computer-readable medium of claim 17 wherein enforcing the coallocation solution comprises:
executing a computer program, wherein the coallocation solution guides field-level allocations in heap memory.

28. The computer-readable medium of claim 17 wherein the determining comprises:
computing a weighted set packing for one or more field coallocation sets; and
selecting the coallocation solution.

29. A computer-readable storage medium storing computer-executable instructions for causing when executed by a computer system programmed thereby to perform a method of enhancing cache performance, the method comprising:
receiving a comprehensive temporal data access profile for a computer program;
detecting one or more data access patterns in the temporal data access profile, each of the one or more data access patterns including plural data accesses and occurring one or more times in the temporal data access profile;
analyzing the one or more data access patterns and the temporal data access profile to determine a coallocation solution for allocations in memory, the coallocation solution comprising one or more directions to allocate particular heap objects to particular heap memory arenas; and
enforcing the coallocation solution during subsequent execution of the computer program by coallocating sets of heap objects in heap memory arenas according to the one or more directions of the coallocation solution in order to improve locality for accesses of the heap objects.

30. The computer-readable medium of claim 29 wherein the temporal data access profile traces accesses of objects, and wherein the one or more data access patterns are for object accesses.

31. The computer-readable medium of claim 29 wherein the temporal data access profile traces accesses of object fields, and wherein the one or more data access patterns are for object field accesses.

32. The computer-readable medium of claim 29 wherein the coallocation solution includes field reordering.

33. The computer-readable medium of claim 29 wherein the coallocation solution includes object splitting.

34. The computer-readable medium of claim 29 wherein the coallocation solution includes object merging.

35. The computer-readable medium of claim 29 wherein the coallocation solution is for guiding memory placement decisions for heap objects in subsequent execution of the computer program.

36. The computer-readable medium of claim 29 wherein enforcing the coallocation solution comprises altering the computer program to implement the coallocation solution.

37. The computer-readable medium of claim 36 wherein the altering comprises binary rewriting of the computer program.

38. The computer-readable medium of claim 36 wherein the altering comprises rewriting of part of source code of the computer program under control of a programmer.

39. The computer-readable medium of claim 36 wherein the altering comprises adjusting executable code for the computer program at compile time.

40. The computer-readable medium of claim 36 wherein enforcing the coallocation solution further comprises:
after the altering, executing the computer program, wherein run time support software enforces the coallocation solution.

41. A computer-readable medium storing the computer program altered according to the method of claim 36.

42. The computer-readable medium of claim 29 wherein the temporal data access profile includes a series of data accesses spanning execution of the computer program during a profiling run.

43. The computer-readable medium of claim 29 wherein the coallocation solution is for guiding memory placement decisions for heap objects in subsequent execution of the computer program, and enforcing the coallocation solution comprises:
coallocating a first set of heap objects in a first heap memory arena to improve locality for accesses or the first set of heap objects;
coallocating a second set of heap objects in a second heap memory arena to improve locality for accesses of the second set of heap objects; and
allocating other heap objects in a default heap memory arena.

44. A system having a processor and memory for coallocating data in the memory by the processor to improve cache performance, the system comprising:
an analysis module for determining a coallocation solution based at least in part upon a temporal data access pro file of a computer program, the coallocation solution comprising one or more directions to allocate particular heap objects to particular heap memory arenas;
an instrumentation module for automating alteration of the computer program based at least in part upon the coallocation solution; and
an enforcement module for automatically enforcing the coallocation solution during execution of the altered computer program by coallocating sets of heap objects in heap memory arenas according to the one or more directions of the coallocation solution.

45. The system of claim 44 further comprising:
a profiling module for generating the temporal data access profile.

46. The system of claim 44 wherein the instrumentation module comprises a binary re-writer.

47. The system of claim 44 wherein the instrumentation module automates changing of heap allocation requests to heap coallocation requests.

48. The system of claim 44 wherein the enforcement module comprises a library for run time support of heap coallocation requests.

49. The system of claim 44 further comprising a plurality of memory arenas in which to implement the coallocation solution.

50. The system of claim 44 wherein the analysis mod We determines a heat value for each of one or more hot data streams in the temporal data access profile.

51. The system of claim 44 wherein the temporal data access profile traces object field accesses.

52. The system of claim 44 wherein the temporal data access profile traces object accesses.

* * * * *

UNITED STATES PATENT AND TRADEMARK OFFICE
CERTIFICATE OF CORRECTION

| | | |
|---|---|---|
| PATENT NO. | : 7,343,598 B2 | Page 1 of 1 |
| APPLICATION NO. | : 10/737205 | |
| DATED | : March 11, 2008 | |
| INVENTOR(S) | : Trishul Chilimbi et al. | |

It is certified that error appears in the above-identified patent and that said Letters Patent is hereby corrected as shown below:

In column 26, line 18, in Claim 12, delete "steams" and insert --streams--, therefor.

In column 26, line 25, in Claim 14, delete "steams" and insert --streams--, therefor.

In column 26, line 27, in Claim 14, delete "steams" and insert --streams--, therefor.

In column 26, line 44, in Claim 17, delete "increases" and insert --increase--, therefor.

In column 27, line 2, in Claim 23, delete "abject" and insert --object--, therefor.

In column 27, line 13, in Claim 26, delete "perfonning" and insert --performing--, therefor.

In column 28, line 23, in Claim 43, delete "or" and insert --of--, therefor.

In column 28, line 34, in Claim 44, delete "pro file" and insert --profile--, therefor.

In column 28, line 59, in Claim 50, delete "mod We" and insert --module--, therefor.

Signed and Sealed this
Twenty-second Day of February, 2011

David J. Kappos
*Director of the United States Patent and Trademark Office*